(12) United States Patent
Nayar et al.

(10) Patent No.: US 7,495,699 B2
(45) Date of Patent: Feb. 24, 2009

(54) IMAGING METHOD AND SYSTEM

(75) Inventors: Shree K. Nayar, New York, NY (US); Terrance Boult, Monument, CO (US)

(73) Assignee: The Trustees of Columbia University in the City of New York, New York, NY (US)

( * ) Notice: Subject to any disclaimer, the term of this patent is extended or adjusted under 35 U.S.C. 154(b) by 490 days.

(21) Appl. No.: 10/951,047

(22) Filed: Sep. 23, 2004

(65) Prior Publication Data

US 2005/0275747 A1    Dec. 15, 2005

Related U.S. Application Data

(63) Continuation of application No. PCT/US03/09759, filed on Mar. 27, 2003.

(60) Provisional application No. 60/368,079, filed on Mar. 27, 2002, provisional application No. 60/391,904, filed on Jun. 27, 2002.

(51) Int. Cl.
*H04N 5/262* (2006.01)
*H04N 5/235* (2006.01)
*H04N 5/228* (2006.01)

(52) U.S. Cl. ................. 348/239; 348/229.1; 348/222.1

(58) Field of Classification Search ................. 348/239, 348/229.1, 222.1
See application file for complete search history.

(56) References Cited

U.S. PATENT DOCUMENTS

| | | | | |
|---|---|---|---|---|
| 5,101,276 A | 3/1992 | Ohta | ................... | 358/213.19 |
| 5,420,635 A | 5/1995 | Konishi et al. | ............. | 348/362 |
| 5,629,752 A * | 5/1997 | Kinjo | .......................... | 355/35 |
| 5,828,793 A | 10/1998 | Mann | ......................... | 382/284 |
| 5,969,761 A | 10/1999 | Takahashi et al. | ........... | 348/362 |
| 6,188,434 B1 | 2/2001 | Tsuchiya | ..................... | 348/347 |
| 6,204,881 B1 | 3/2001 | Ikeda et al. | ................. | 348/362 |
| 6,301,440 B1 * | 10/2001 | Bolle et al. | ................. | 396/128 |
| 6,940,545 B1 * | 9/2005 | Ray et al. | ................ | 348/222.1 |

FOREIGN PATENT DOCUMENTS

| | | |
|---|---|---|
| EP | 0975154 | 1/2000 |
| JP | 10262182 | 9/1998 |
| WO | 02065786 | 8/2002 |

OTHER PUBLICATIONS

H. Munase and S. K. Nayar, Visual Learning and Recognition of 3-D Objects From Appearance, International Journal of Computer Vision 14: pp. 5-24 (1995).
Zhang et al. (1995) "Video Parsing, Retrieval and Browsing: An Integrated and Content-Based Solution", ACM International Conference on Multimedia: 15-24.

* cited by examiner

*Primary Examiner*—James M Hannett
(74) *Attorney, Agent, or Firm*—Baker Botts L.L.P.

(57) ABSTRACT

A method and system for accurately imaging scenes having large brightness variations. If a particular object in the scene is of interest, the imager exposure setting is adjusted based on the brightness of that object. For high dynamic range imaging of an entire scene, two imagers with different viewpoints and exposure settings are used, or the exposure setting of a single imager is varied as multiple images are captured. An optical flow technique can be used to track and image moving objects, or a video sequence can be generated by selectively updating only those pixels whose brightnesses are within the preferred brightness range of the imager.

10 Claims, 20 Drawing Sheets

| Predicted pixel values | | | | |
|---|---|---|---|---|
| reference camera (3) M3 | camera (1) M1 | camera (2) M2 | camera (4) M4 | camera (5) M5 |
| 0<=M3<B1 | M1=M3/R13 | M2=M3/R23 | M4=M3/R43 | M5=M3/R53 |
| B1<=M3<B2 | M1=M3/R13 | M2=M3/R23 | M4=M3/R43 | M5=1.0 |
| B2<=M3<1.0 | M1=M3/R13 | M2=M3/R23 | M4=1.0 | M5=1.0 |
| M3=1.0 | M1>=B4 | M2>=B3 | M4=1.0 | M5=1.0 |

IMAGING METHOD AND SYSTEM

CROSS REFERENCE TO RELATED APPLICATION(S)

The present application is a continuation of International Patent Application No. PCT/US03/09759, filed Mar. 27, 2003, published on Oct. 9, 2003 as International Patent Publication No. WO 03/083773, which claims priority to U.S. Provisional Application Ser. No. 60/368,079, entitled "Method and Apparatus for Capturing High Dynamic Range Video by Varying Exposure Over Time and Viewpoint," filed on Mar. 27, 2002; and U.S. Provisional Application Ser. No. 60/391,904, entitled "Method and Apparatus for Capturing High Dynamic Range Video by Varying Exposure Over Time and Viewpoint," filed on Jun. 27, 2002, the contents of which hereby incorporated by reference in their entireties herein.

STATEMENT REGARDING FEDERALLY SPONSORED RESEARCH OR DEVELOPMENT

This invention was made with support provided in part by the U.S. Government under National Science Foundation Research Award No. IIS-00-85864. Accordingly, the U.S. Government may have certain rights in this invention.

BACKGROUND OF THE INVENTION

Imagers such as still cameras and video cameras have a finite ability to resolve small differences in intensity, and are also only able to measure intensity accurately within a finite range. The range from the smallest detectable intensity above the noise to the largest intensity below saturation—commonly referred to as "dynamic range"—is therefore limited in conventional imagers. As a result, if a scene being imaged contains both very bright regions and very dark regions, it can be difficult to image the entire scene precisely and accurately.

One approach to solving this problem is to sequentially capture multiple images of the same scene using different exposures. The exposure for each image is typically controlled by varying either the F-number of the imaging optics or the exposure time of the image sensor. An image captured using a high exposure setting will tend to represent dark regions accurately but may exhibit saturation in bright regions. In contrast, an image captured using a low exposure setting will avoid saturation in bright regions but may be undesirably dark and noisy in the dark areas. Such differently exposed images can be combined into a single high dynamic range image—e.g., by using the high-exposure data for darker regions and the low-exposure data for brighter regions. The "dynamic range" of an image, as used herein, refers to the range from the lowest pixel brightness value in the image—corresponding to the smallest detected intensity—to the highest pixel brightness value in the image—corresponding to the largest detected intensity.

The above-described method is best suited to scenes that are static or very slowly changing. In particular, the locations and radiances of the scene objects must remain relatively constant during the capture of a sequence of images under different exposures. The imager itself must also be stationary. Only if the images are captured in rapid succession can they be fused accurately to derive a high dynamic range image or video sequence without substantial errors and artifacts.

The requirement of a static or slowly changing scene can be avoided by using multiple imaging systems. For example, in one system, a beam splitter arrangement is used to permit multiple imagers to simultaneously sense the incoming light field. Each imager has a preset exposure setting which is different from those of the other imagers. The exposure setting of each imager is typically set by using an optical attenuator or by adjusting the exposure time of the sensor. This approach has the benefit of producing accurate, high dynamic range images in real time, even if the scene objects and/or the imager move during image capture. However, such a system tends to be expensive because it requires multiple imagers, precision optics for the alignment of the acquired images, and additional hardware for the capture and processing of the multiple images.

An additional approach to high dynamic range imaging is based on a modification of the conventional charge coupled device (CCD) array. In the modified CCD array, each detector cell includes two sensing elements (potential wells) having different sizes and, accordingly, different saturation levels. When the modified CCD array is exposed to incoming light, two measurements of the light intensity are made within each cell. The measurements within each cell are combined on-chip before the image is read out. However, this technique is expensive because it entails fabrication of a sophisticated and costly CCD array. In addition, the spatial resolution of the CCD array is reduced, because each pair of light sensing elements occupies more chip area than a single light sensing element of a conventional array. In addition, such a system requires extra on-chip circuitry for combining the outputs (photogenerated charge) of the two light sensing elements of each cell.

An additional image sensing array which has been used for high dynamic range imaging is a solid state array of light sensing elements in which the light sensing element in each pixel position of the array includes a computational element for measuring the time required for a potential well associated with the light sensing element to reach its full charge capacity. The array is typically designed so that the photogenerated charge storage capacity is the same for light sensing elements at all pixel positions. Accordingly, the length of time in which any given potential well becomes filled with photogenerated charge is proportional to the irradiance at the pixel position of the associated light sensing element. The recorded time values are read out and converted to a high dynamic range image. At least one device having 32×32 light sensing elements has been implemented. This approach can be useful for low-resolution image sensors, but is difficult to scale up to high resolution image sensing arrays without greatly increasing fabrication costs. In addition, because exposure times tend to be long in dark scene regions, this technique tends to be susceptible to motion blur.

Yet another system uses an image sensing array with spatially varying pixel sensitivities to achieve high dynamic range. In this approach, respective groups of light sensing elements at neighboring pixel positions in the image sensing array are fabricated to have different, fixed sensitivities. Such an arrangement allows simultaneous sampling of the spatial dimensions of the scene and of the exposure dimension of image irradiance. In most images, because a variety of different pixel sensitivities are available in any given region of the array, even if the light sensing element at a particular pixel position is saturated, it is likely that at least one light sensing element at a neighboring pixel position is not saturated. Similarly, if the light sensing element at a particular pixel position is underexposed or even has a measured brightness of zero, it is likely that at least one light sensing element at a neighboring pixel position measures a non-zero brightness. However, a drawback of such a system is that some spatial resolution of the image is sacrificed to attain the increased brightness resolution. Moreover, because the exposure value at each pixel position is fixed, not every pixel is measured with full precision.

SUMMARY OF THE INVENTION

It is therefore an object of the present invention to provide an imaging method and system capable of imaging changing scenes to generate video and/or still images having high dynamic range.

It is a further object of the present invention to provide such images at a high frame rate so as to decrease motion blur.

It is yet another object of the present invention to provide such images without requiring precision optics such as a precision beam splitter for alignment of images acquired by multiple imagers.

It is a still further object of the present invention to provide high dynamic range imaging without sacrificing spatial resolution.

These and other objects are accomplished by the following aspects of the present invention.

In accordance with one aspect of the present invention, an imager having a preferred brightness range captures a first image by imaging a scene which contains one or more objects of interest. One or more portions (e.g., pixels or groups of pixels) of the first image represent the objects of interest. The first image is processed by an object detection procedure to identify the portions of the image that contain the objects of interest. Based upon the first exposure setting and the respective brightness values of the aforementioned image portions, the exposure setting of the imager is adjusted to allow the imager to image the objects of interest within the imager's preferred brightness range.

In accordance with an additional aspect of the present invention, two imagers having different exposure settings and viewpoints are used to image a scene. The resulting images are fused to generate a fused image which has a dynamic range greater than those of the original images.

In accordance with yet another aspect of the present invention, an optical flow procedure is used to accurately image moving objects while changing the exposure setting of the imager to increase dynamic range. The scene containing an object of interest is imaged at a first time at a first exposure setting to generate a first image. The first image includes a first image portion corresponding to at least a portion of the object of interest. The first image portion has a first brightness value which is within the preferred brightness range of the imager. The scene is imaged at a second time with a second exposure setting to generate a second image, the second image including a second image portion corresponding to the object of interest. The second image portion has a second brightness value which is within the preferred brightness range of the imager. Because the object has moved between the times at which the first and second images were captured, the location of the second image portion within the second image is different from the location of the first image portion within the first image. The scene is imaged by the imager at a third time using a third exposure setting to generate a third image. The time at which the third image is generated can be before, between, or after the times at which the first and second images are generated. The third exposure setting is different from the first and second exposure settings, and the portion of the third image that contains the object of interest has a brightness value that is not within the preferred brightness range of the imager. In order to ensure that the object of interest is imaged accurately, the third image is replaced by a fourth image derived from the first, second, and third images.

The fourth image includes an image portion that corresponds to the portion of the object of interest. The computed brightness value of the fourth image portion is based on the first brightness value, the second brightness value, the first exposure setting, and the second exposure setting. The location of the fourth image portion within the fourth image is based on the location of the third image portion within the third image, which is determined based on the location of the first image portion within the first image and the location of the second image portion within the second image. The location of the third image portion is typically determined by interpolating or extrapolating the motion of the object of interest based on the locations of the first and second image portions—for example, by computing an optical flow vector based on the locations of the first and second image portions.

In accordance with a still further aspect of the present invention, a scene containing one or more moving objects is captured with high dynamic range in a video sequence by varying the exposure setting of the imager between frames, and by updating only those pixels whose brightness values are within the preferred brightness range of the imager. The scene is imaged by the imager at a first time using a first exposure setting to generate a first video frame, the first video frame including at least first and second pixels having respective pixel locations. The scene is then imaged at a second time using a different exposure setting to generate an image which includes at least third and fourth pixels having the same respective locations as the first and second pixels. The brightness value of the third pixel is within the preferred brightness range of the imager, whereas the brightness value of the fourth pixel is not. A second video frame is derived from the first video frame and the image. The second video frame includes fifth and sixth pixels which have the same locations as the first and second pixels, respectively. The pixel value (e.g., the brightness or color) of the fifth pixel is derived from that of the third pixel, whereas the pixel value of the sixth pixel is derived from that of the second pixel, but not from that of the fourth pixel.

BRIEF DESCRIPTION OF THE DRAWINGS

Further objects, features, and advantages of the present invention will become apparent from the following detailed description taken in conjunction with the accompanying figures showing illustrative embodiments of the present invention, in which.

Throughout the drawings, unless otherwise stated, the same reference numerals and characters are used to denote like features, elements, components, or portions of the illustrated embodiments.

DETAILED DESCRIPTION OF THE INVENTION

Figure 9:
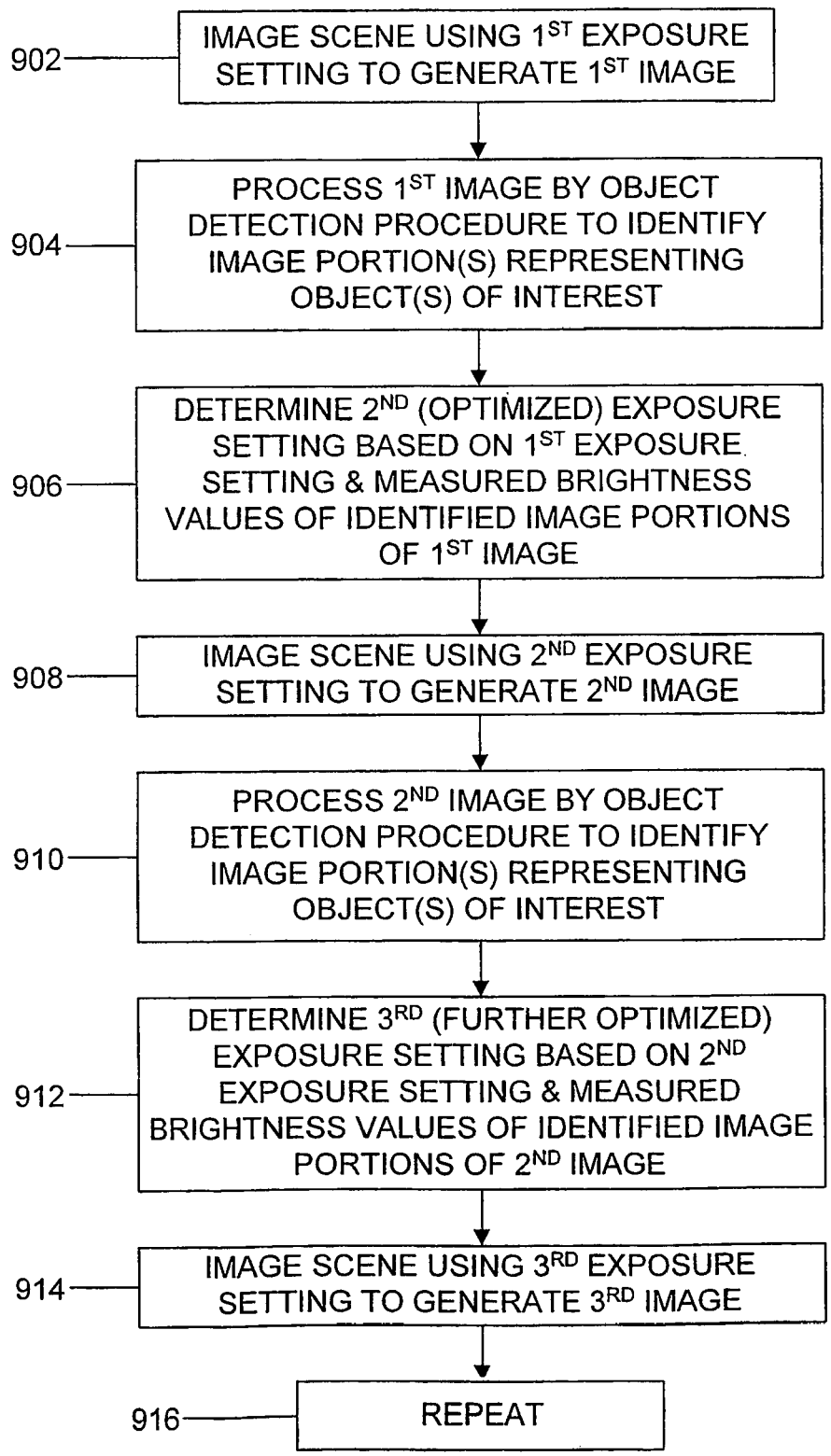
FIG. 9 is a flow diagram illustrating an exemplary procedure for deriving high dynamic range image data in accordance with the present invention.
Figure 16:
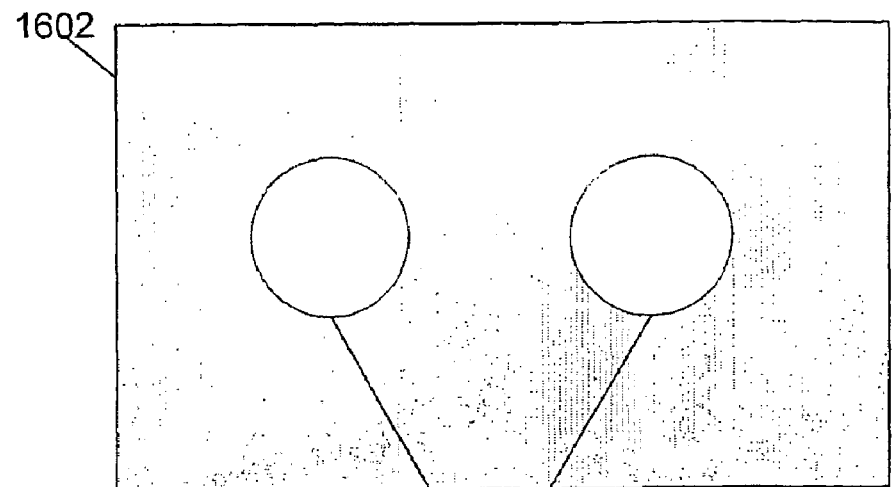
FIG. 16 is a set of diagrams illustrating exemplary image data derived by an imaging method and system in accordance with the present invention.
Figure 16:
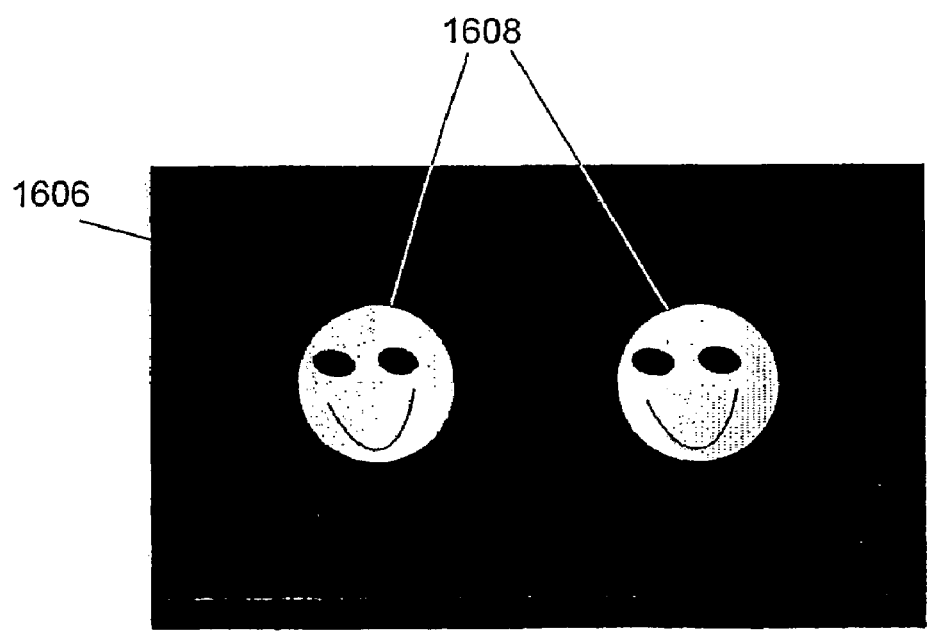

FIGS. 9 and 16 illustrate the operation of an exemplary procedure for imaging in accordance with the present invention. Unlike conventional automatic gain control (AGC), which uses the average brightness of an entire scene to adjust the exposure setting of an imager, the illustrated procedure bases the exposure setting adjustment on particular objects of interest within the scene. The scene is imaged using a first exposure setting to generate a first image 1602 (step 902). The first image 1602 is processed by an object detection procedure to identify image portion(s) 1604 representing object(s) of interest (step 904). For example, if the objects of interest are faces, the object detection procedure in step 904 preferably comprises a face detection procedure. Those skilled in the art will be familiar with numerous commercially available face recognition programs such as, for example, the FaceIt® software package available from Identix Inc. An additional exemplary object recognition technique is described in II. Munase and S. K. Nayar, "Visual Learning and Recognition of 3D Objects From Appearance," Int. J. Comp. Vision, v. 14, n. 1, pp. 5-24 (1995).

Based on the first exposure setting and the brightness values of the image portions 1604 identified in the first image 1602, the algorithm computes an exposure setting suitable for bringing the objects of interest into the preferred brightness range of the imager (step 906). For example, if the objects of interest appear underexposed or overexposed, the algorithm computes an adjustment factor by dividing the optimum brightness of the imager by the average brightness of the relevant pixels representing the objects of interest. The second (new) exposure setting is determined by multiplying the first exposure setting by the aforementioned adjustment factor. The second exposure setting thus allows accurate imaging of the objects of interest, although further refinement of the exposure setting typically is performed, as is discussed below.

The scene is imaged using the second exposure setting to generate a second image 1606 (step 908). Similarly to the first image 1602, the second image 1606 contains image portion(s) 1608 representing the object(s) of interest. However, because the exposure setting of the imager has now been adjusted to accurately image the objects of interest, the objects of interest are more accurately represented by the relevant portions 1608 of the second image 1606 than by the corresponding portions 1604 of the first image 1602. Preferably, the exposure setting is further adjusted by repeating the above-described steps as follows. The second image 1606 is processed by the object detection procedure to identify the image portion(s) 1608 representing the object(s) of interest (step 910). A third (further adjusted) exposure setting is determined based upon the second exposure setting and the brightness values of the identified image portions 1608 of the second image 1606 (step 912). The scene is then imaged again using the third exposure setting to generate a third image (step 914). The procedure can be repeated as many times as is desired, or even indefinitely (step 916).

Figure 10:
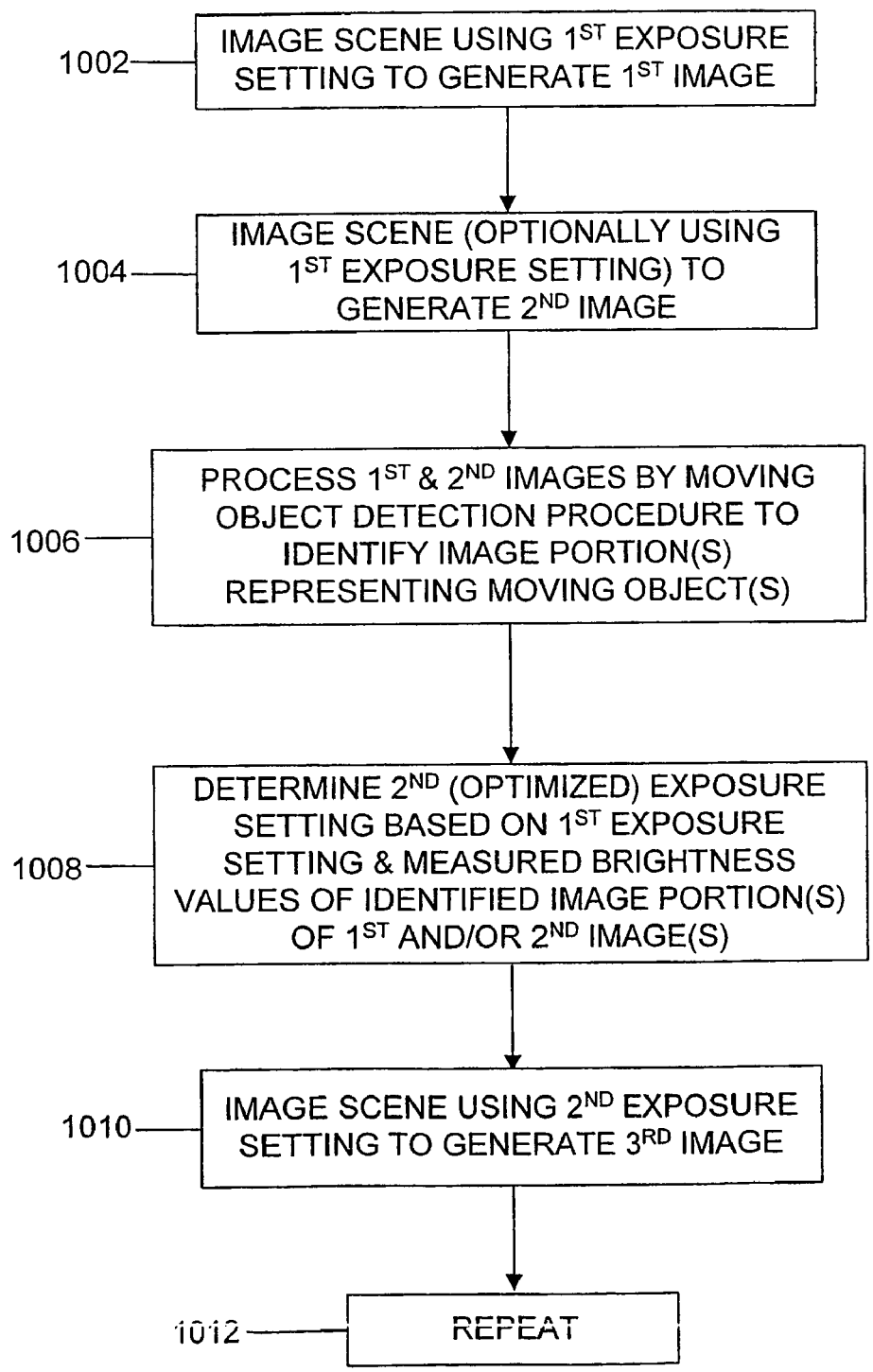
FIG. 10 is a flow diagram illustrating an additional exemplary procedure for deriving high dynamic range image data in accordance with the present invention.
Figure 17:
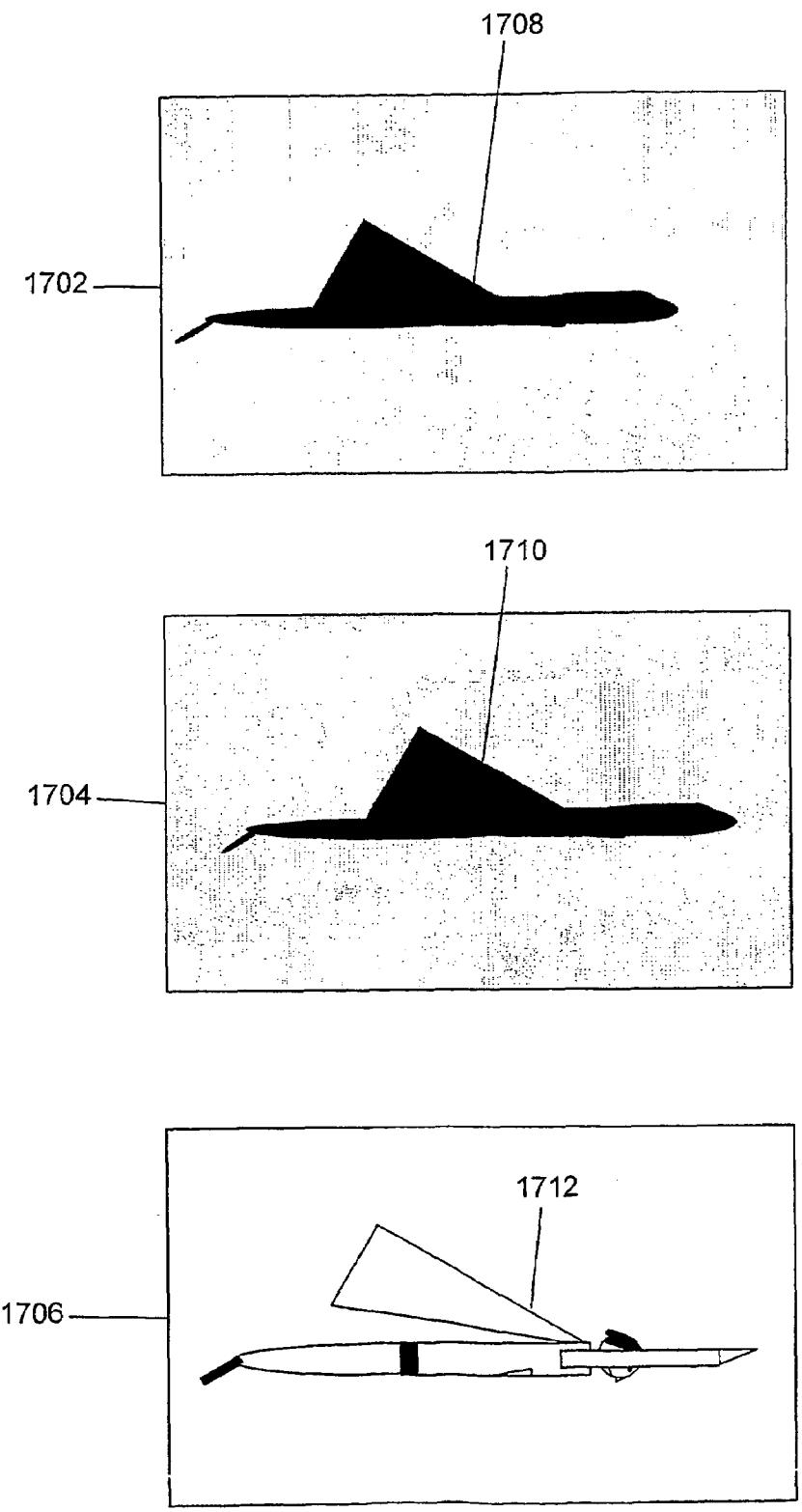
FIG. 17 is a set of diagrams illustrating additional exemplary image data derived by an imaging method and system in accordance with the present invention.

If moving objects are of particular interest, the exposure setting of the imager can be adjusted based upon detected moving objects, as is illustrated in FIGS. 10 and 17. In the illustrated procedure, the scene is imaged using a first exposure setting to generate a first image 1702 (step 1002). The scene is imaged at a later time—using either the same exposure setting or a different exposure setting—to generate a second image 1704 (step 1004). The first and second images 1702 and 1704 are processed by a moving object detection procedure to identify any image portion(s) 1708 and 1710 representing moving object(s) (step 1006). In the same manner discussed above with respect to step 906 (in FIG. 9), an adjusted exposure setting is determined based upon the exposure settings of the first and second images 1702 and 1704 and on the brightness values of the image portions 1708 and 1710 identified as containing moving objects (step 1008). Using the new exposure setting, the scene is imaged again to generate a third image 1706 (step 1010). Similarly to the first and second images 1702 and 1704, the third image 1706 includes one or more image portions 1712 which represent the moving object(s). However, because the exposure setting has now been adjusted to accommodate the brightness(es) of the moving object(s), the object(s) is/are represented more accurately in the third image 1706 than in the first and second images 1702 and 1704. The procedure can be repeated as many times as is desired, or even indefinitely (step 1012).

Figure 2:
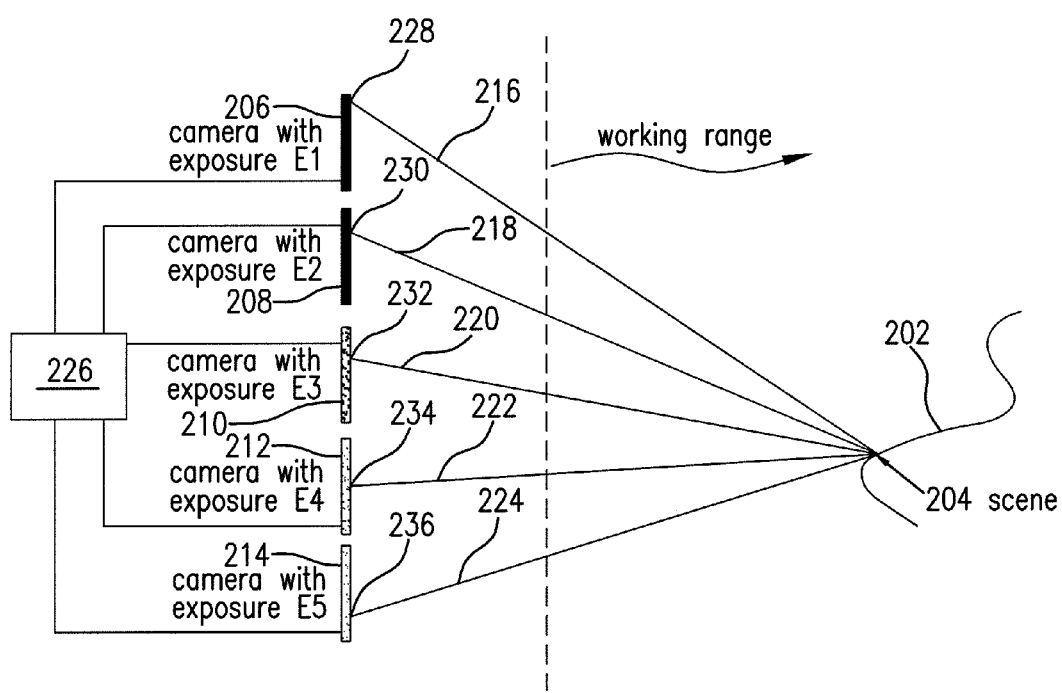
FIG. 2 is a diagram illustrating an exemplary system for providing high dynamic range images in accordance with the present invention.

FIG. 2 illustrates an exemplary multi-imager system for generating high dynamic range image data in accordance with the present invention. In the illustrated system, a scene 202 is imaged by a plurality of imagers 206, 208, 210, 212, and 214, each having a different exposure setting—exposure settings E1, E2, E3, E4, and E5, respectively—and a different viewpoint—viewpoints 216, 218, 220, 222, and 224, respectively. The illustrated system also includes a separate processor 226 in communication with the imagers 206, 208, 210, 212, and 214 for performing the image processing procedures discussed below. Alternatively, or in addition, such a processor 226 can be incorporated into one or more of the imagers 206, 208, 210, 212, and 214.

Because of the parallax introduced by the different viewpoints 216, 218, 220, 222, and 224, any given point 204 within the scene 202 is imaged at a different location—locations 228, 230, 232, 234, and 236, respectively—in each of the images generated by the different imagers 206, 208, 210, 212, and 214. However, if the distance between the scene point 204 and the imagers 206, 208, 210, 212, and 214 is much greater than the greatest distance between any of the imagers 206, 208, 210, 212, and 214, the resulting parallax should be minimal, and fusion of the respective images should require little or no spatial adjustment to account for it.

Figure 11:
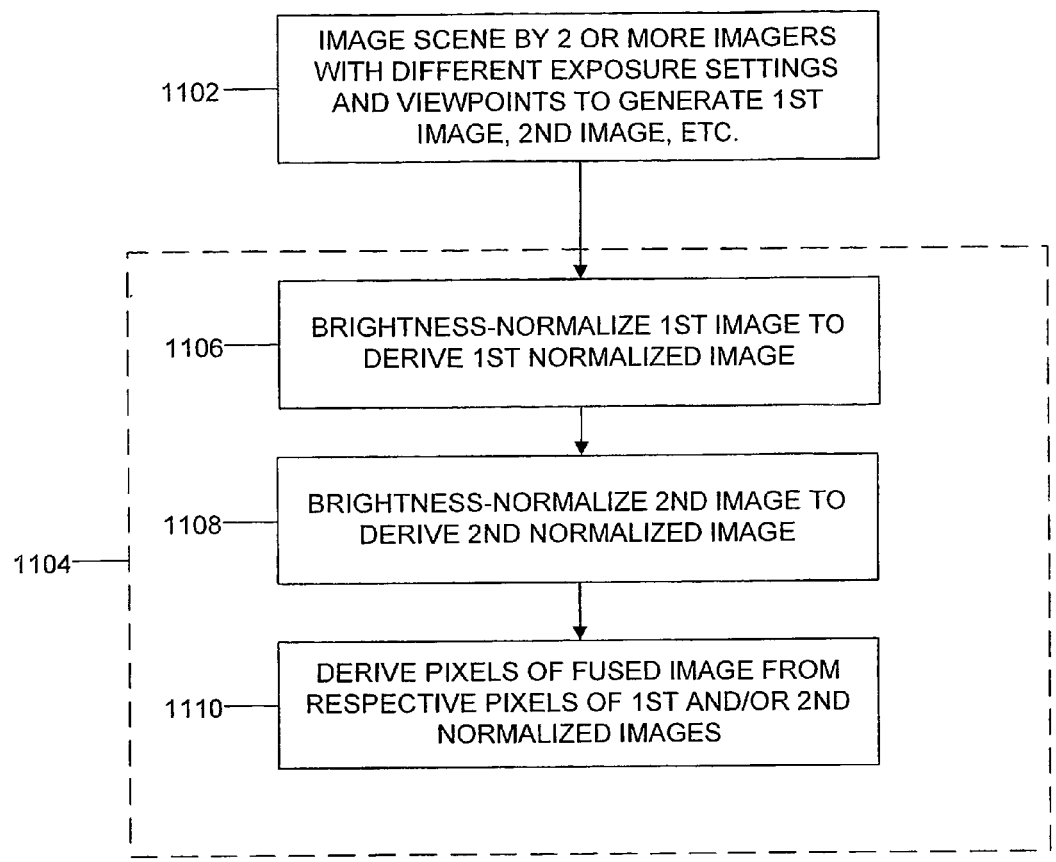
FIG. 11 is a flow diagram illustrating yet another exemplary procedure for deriving high dynamic range image data in accordance with the present invention.

FIG. 11 illustrates an exemplary procedure for operating a multi-imager system such as, for example, the system illustrated in FIG. 2. The scene is imaged by two or more imagers having different exposure settings and viewpoints—e.g., imagers 206, 208, 210, 212, and 214 illustrated in FIG. 2—to generate two or more images (in any case, at least a first image and a second image) (step 1102). The images are then fused to derive a fused image having a higher dynamic range than the initial images (step 1104). For example, the first and second images can be brightness-normalized to derive first and second normalized images (steps 1106 and 1108). To brightness-normalize an image, the brightness values of the respective pixels of the image are typically divided by the exposure setting with which the image was captured. The respective pixels of the fused image are then derived from the corresponding pixels of the first and/or second normalized images (step 1110). For example, each pixel of the fused image can be derived by averaging the normalized values of the corresponding pixels of the first and second normalized images.

Figure 19:
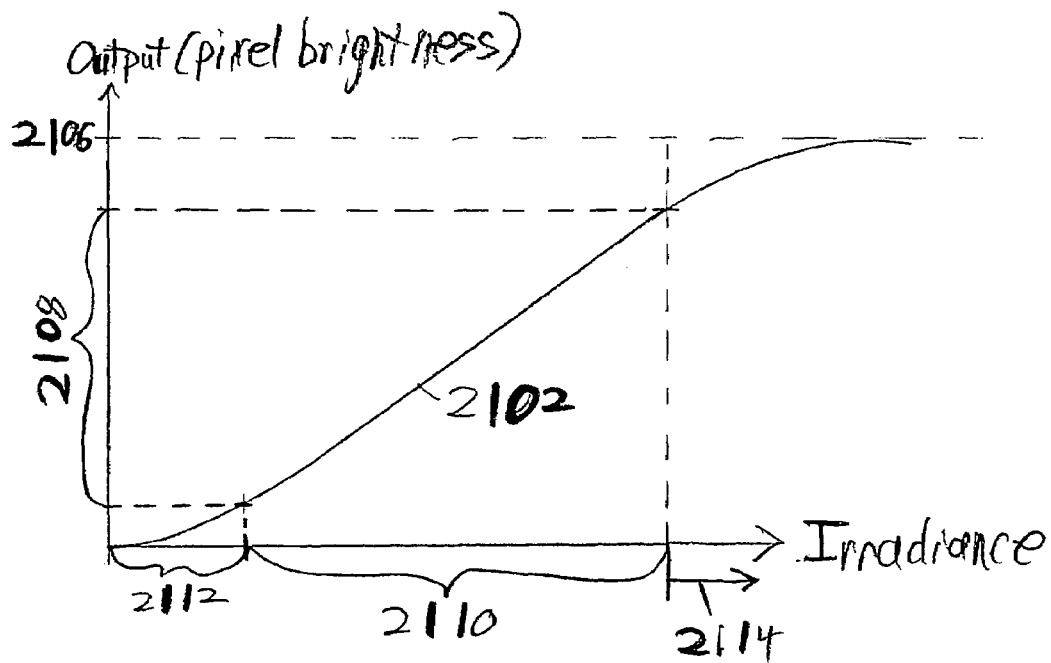
FIG. 19 is a set of graphs illustrating input-output characteristics of typical imagers.
Figure 19:
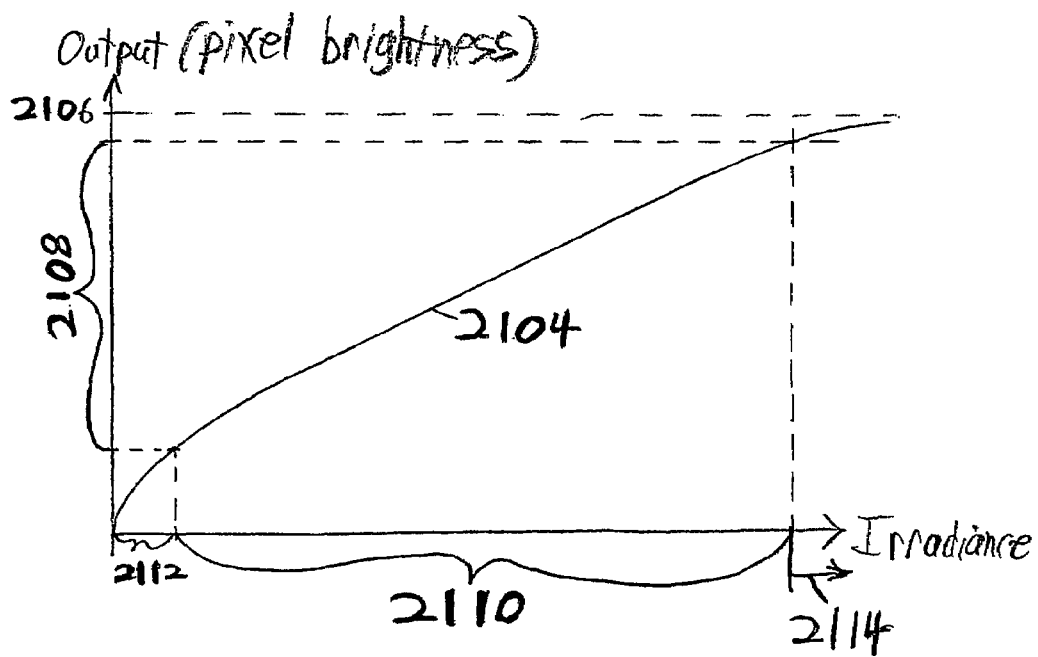

As an additional example, consider that a typical imager has a signal-to-noise ratio (S/N) that varies depending upon the irradiance of the light received by the imager. FIG. 19 illustrates exemplary response curves 2102 and 2104 for typical imagers. Each of the response curves 2102 and 2104 represents the dependence of detector output—i.e., pixel brightness—on the irradiance of the particular portion of the incoming light that is measured to generate the pixel. At low levels of irradiance (region 2112), the S/N tends to be rather poor. At high levels of irradiance (region 2114), the response of a typical imager (response curve 2102 or 2104) exhibits saturation effects (resulting in reduced S/N) as the output of the imager approaches a maximum level 2106. The best S/N performance is achieved in a preferred irradiance range 2110 corresponding to a preferred brightness range 2108. In many imagers, the response curve 2102 or 2104 is relatively linear in this region 2110 of irradiance and the corresponding region 2108 of pixel brightness. In any case, because the noise performance of the imager is best in the preferred brightness range 2108, it is often advantageous to derive a fused pixel by selecting, from among two or more corresponding pixels, the pixel whose brightness is within the preferred brightness range of the imager that captured it.

Figure 12:
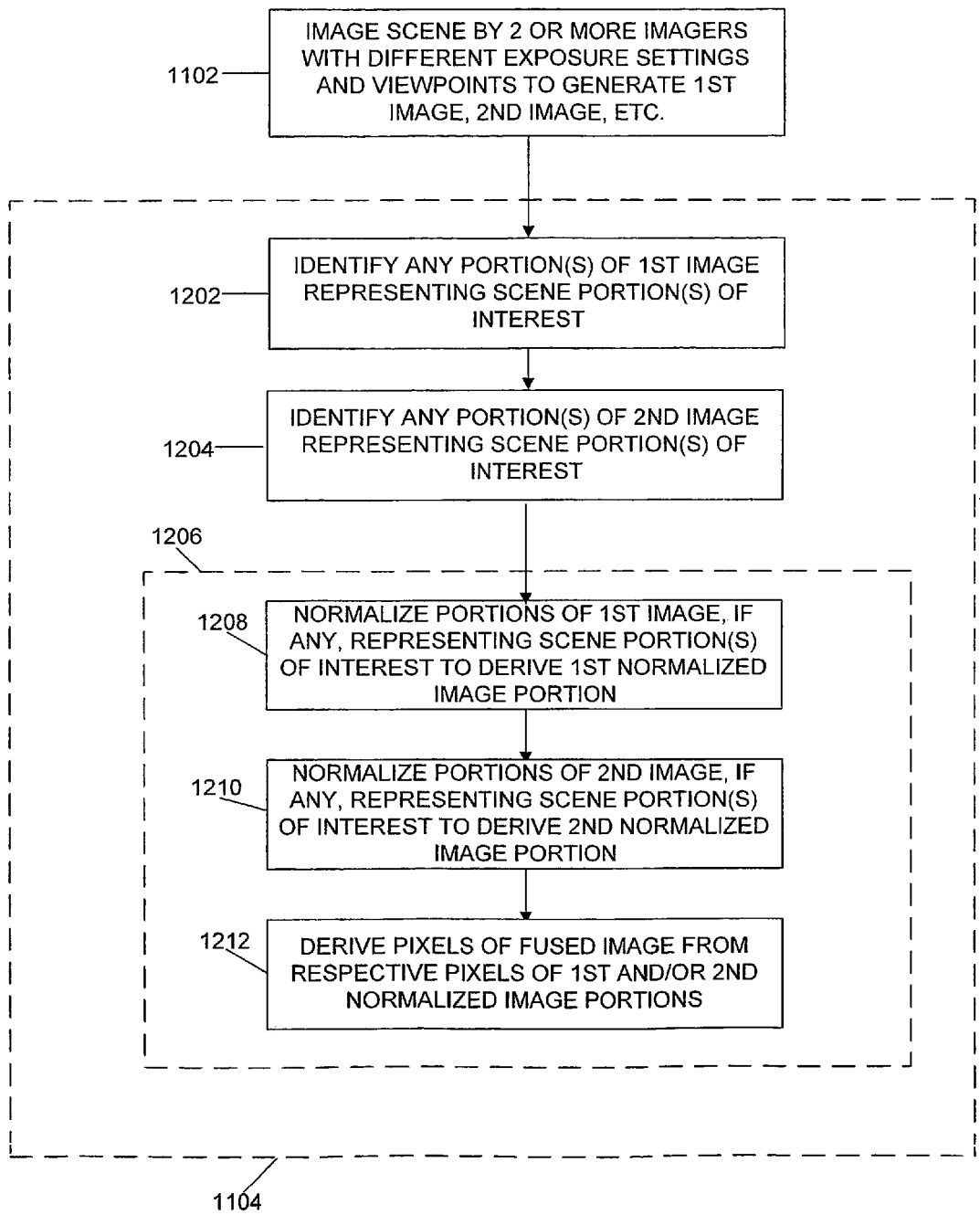
FIG. 12 is a flow diagram illustrating a still further exemplary procedure for deriving high dynamic range image data in accordance with the present invention.

FIG. 12 illustrates an additional procedure for operating the system illustrated in FIG. 2. In the illustrated procedure, the scene 202 is imaged by two or more imagers having different exposure settings and viewpoints—e.g., imagers 206, 208, 210, 212, and 214—to generate a first image, a second image, etc. (step 1102). In the procedure illustrated in FIG. 12, the fusion of the respective images (step 1104) is based on scene portions of interest, rather than on the entire scene. In particular, any portion(s) of the first image representing the scene portion(s) of interest are identified (step 1202). Similarly, any portion(s) of the second image representing the scene portion(s) of interest are identified (step 1204). The fused image is then derived by fusing the portions of the first and second image representing the scene portions of interest (step 1206). Preferably, the portions of the first image representing the scene portions of interest—if there are any such image portions—are brightness-normalized to derive a first normalized image portion (step 1208). Similarly, any portions of the second image representing the scene portions of interest are brightness-normalized to derive a second normalized image portion (step 1210). The respective pixels of the fused image are then derived from corresponding pixels of the first and/or second normalized image portions (step 1212). For example, the brightness or color value of a particular pixel in the fused image can be derived by averaging the pixel values (i.e., the brightness values or color values) of the corresponding pixels in the first and second normalized image portions. As an additional example, if a scene portion of interest is clearly and accurately represented in the first image, but not in the second image, the pixels in the fused image portion that represent the scene portion can be based upon the corresponding pixels in the first image portion, rather than the corresponding pixels in the second image portion.

Figures 5, 6:
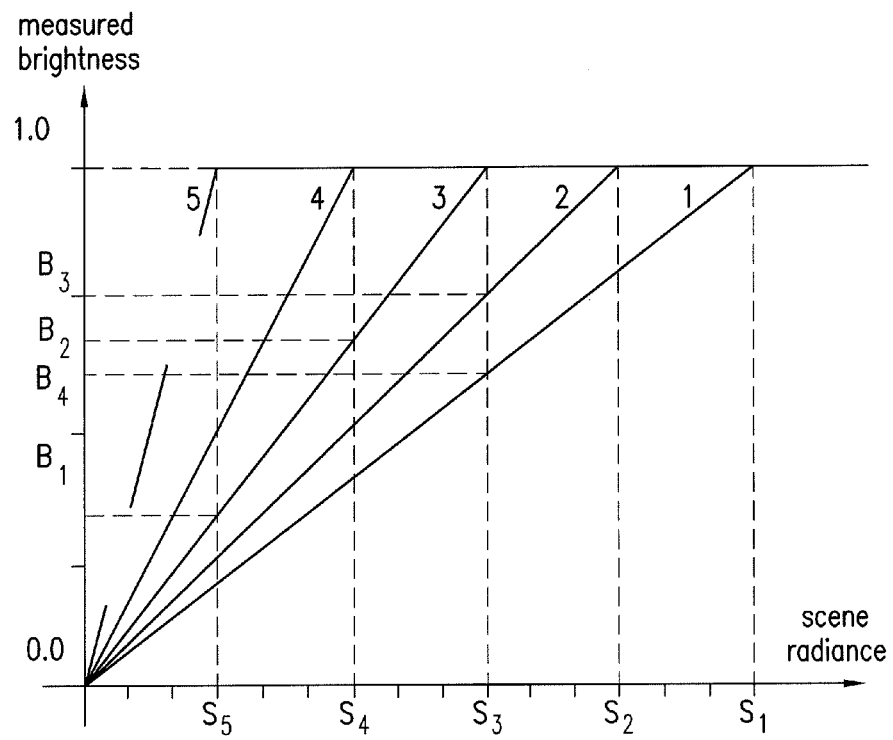
FIG. 5 is a graph illustrating the relationship between scene radiance and measured pixel brightness for imagers included in an imaging system in accordance with the present invention.
FIG. 6 is a table illustrating possible ranges of pixel brightness values in image data generated by an imaging method and system in accordance with the present invention.
Figure 8:
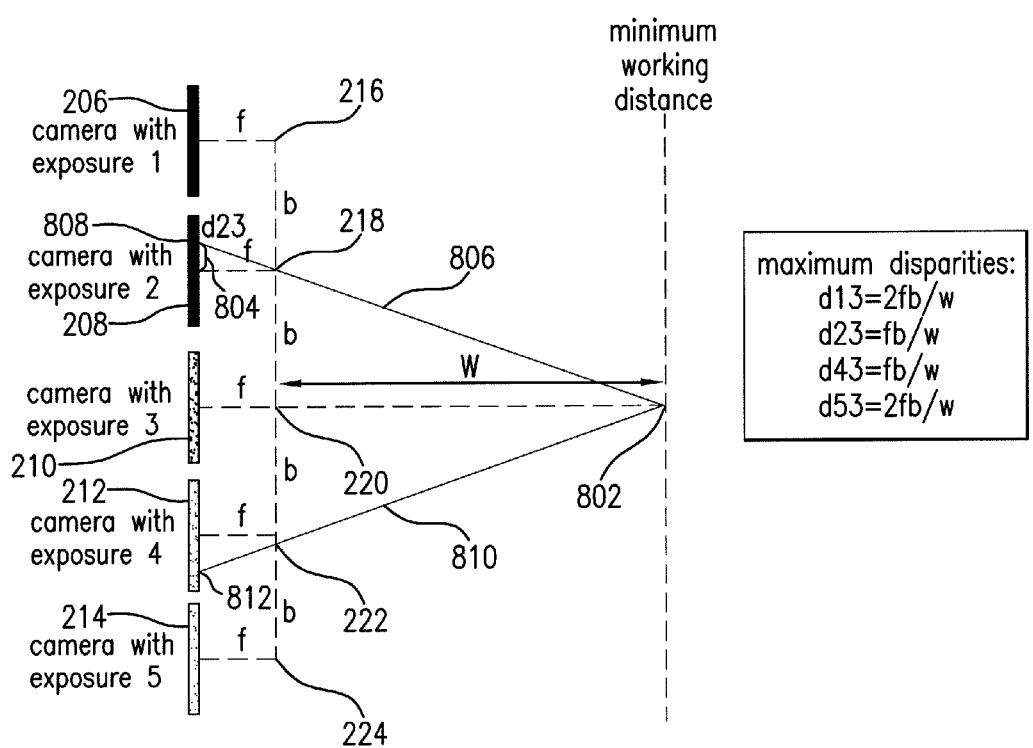
FIG. 8 is a diagram illustrating an exemplary system for generating high dynamic range image data in accordance with the present invention.

If one or more portions (e.g., scene point 204 illustrated in FIG. 2) of the scene 202 being imaged are so close to the imagers 206, 208, 210, 212, and 214 as to cause substantial parallax among the resulting images, the fusion of the images preferably includes parallax compensation as is illustrated in FIGS. 5, 6, and 8. Assuming that all of the scene points are no closer than a particular working distance w, it is straightforward to compute upper limits on the spatial disparities among the images, using the middle imager 210 as a reference imager in this example. Compared to the location of the scene point as represented in the image generated by the reference imager 210, the locations of that scene point in the other images are confined to a limited area in each image. The disparities in the spatial locations of a given scene point as seen in the respective images generated by non-reference imagers 206, 208, 212, and 214 will be maximized if the scene point is exactly at the working distance w of the system—e.g., scene point 802 illustrated in FIG. 8. The maximum disparities d13, d23, d43, and d53 are:

$d13 = 2fb/w$ (for imager 206);

$d23 = fb/w$ (for imager 208);

$d43 = fb/w$ (for imager 212); and $d53 = 2fb/w$ (for imager 214), where f is the focal length of each of the imagers, and b is the baseline (i.e., the distance between the viewpoints) of any two adjacent imagers (the imagers in this example being arranged so that their respective viewpoints are equally spaced).

For any one of the non-reference imagers 206, 208, 212, and 214, a line of the sight passing through a scene point must lie within an angle defined by the maximum disparity for that imager. For example, line of sight 806 illustrated in FIG. 8 is at the maximum angle for imager 208, based on the maximum disparity d23 for that imager 208. Furthermore, the pixel intersected by a line of sight must satisfy certain brightness constraints. In particular, if the correct line of sight has been identified, the corresponding brightness values in the 5 images will satisfy the constraints imposed by the response functions of the 5 cameras—which depend on the exposures of the cameras—as is illustrated in FIG. 5. These constraints are listed in the table 602 shown in FIG. 6, where: B1, B2, B3, B4, and B5 denote the brightness values, as measured by the reference imager 210, at which the respective imagers 206, 208, 210, 212, and 214 reach saturation; M1, M2, M3, M4, and M5 denote the respective predicted brightness values of the pixels in each image that represent a particular scene point (e.g., scene point 802 illustrated in FIG. 8); E1, E2, E3, E4, and E5 denote the exposure settings of imagers 206, 208, 210, 212, and 214, respectively; and R13, R23, R43, and R53 denote the exposure ratios E1/E3, E2/E3, E4/E3, and E5/E3, respectively. In other words, for each pixel value in the fused image, the line of sight that best satisfies the above brightness constraints is determined. Then, the actual brightness value of the pixel can be computed as a function of the multiple measured values along the line of sight.

Figure 18A:
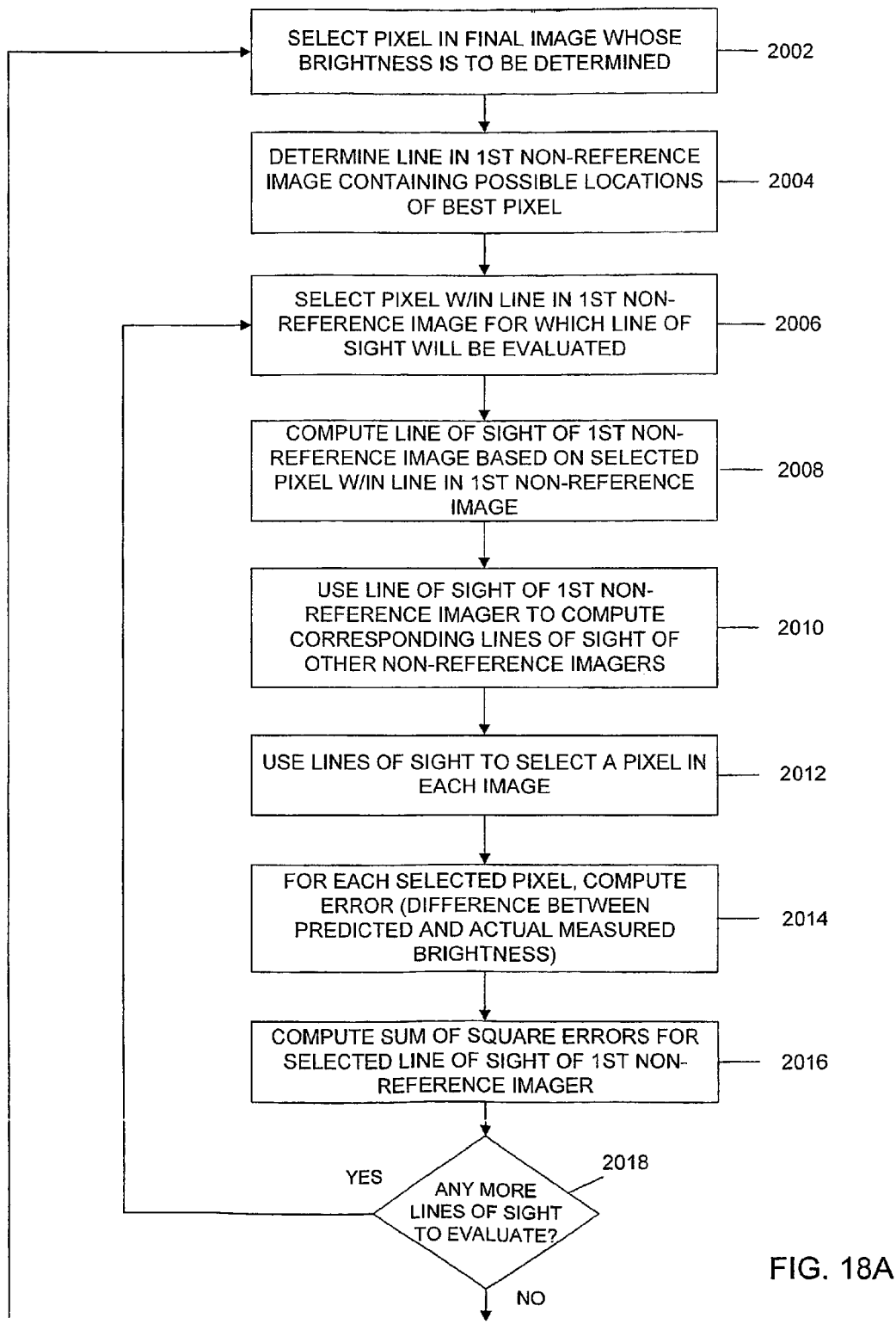
FIGS. 18A and 18B are two portions of a diagram illustrating an exemplary procedure for fusing images while accounting for parallax in accordance with the present invention.
Figure 18B:
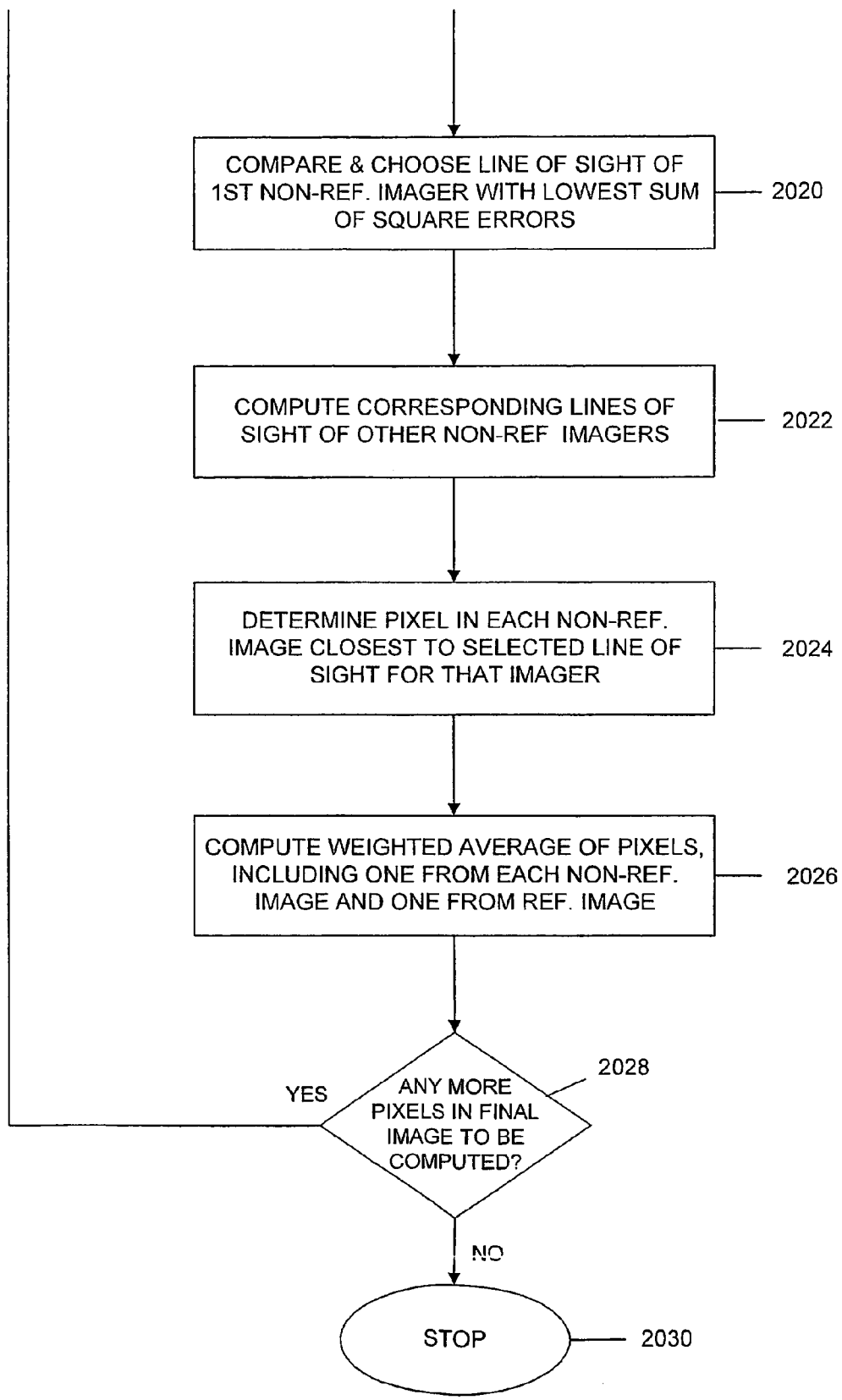

FIGS. 18A and 18B illustrate an exemplary fusion procedure which uses least square error regression to determine the best line of site for each scene point, and which then uses the best line of sight to derive a corresponding pixel of the final image. The illustrated algorithm selects a first pixel in the final image who brightness is to be determined (step 2002). Based upon the above equations for maximum disparities d13, d23, d43, d53, the algorithm determiniles a line of possible pixels in a first non-reference image; this line contains the possible locations of the pixel representing the scene point (step 2004). For example, as is illustrated in FIG. 8, the first non-reference image can be the image generated by non-reference camera 208, in which case the line 804 of possible pixels is defined by the maximum disparity d23 for that camera 208. However, any of the non-reference cameras 206, 208, 212, and 214 can be used. Each pixel along the line 804 of possible pixels is evaluated as follows, to determine whether the line of sight corresponding to that pixel, considered in the context of the corresponding lines of sight from the other imagers, provides results consistent with the predicted pixel values indicated in the table 602 illustrated in FIG. 6. The algorithm selects a first pixel within the line 804 in the first non-reference image (e.g., the image generated by camera 208) for which a line of sight will be evaluated (step 2006). For example, the algorithm can begin at a pixel 808 at one end of the line 804 illustrated in FIG. 8. The algorithm computes the line of sight 806 corresponding to the selected pixel 808 within the line 804 of possible pixels in the first non-reference image (step 2008). The line of sight 814 of the reference imager 210 and the line of sight 806 of the non-reference imager 208 computed in step 2008 together imply a hypothetical position of the scene point 802, which in turn implies hypothetical lines of sight for the other imagers 206, 212 and 214. For example, as is illustrated in FIG. 8, line of sight 806 of imager 208 and line of sight 814 of the reference imager 210 imply a corresponding line of sight 810 of imager 212. The corresponding lines of sight of the respective non-reference imagers 206, 212, and 214 are computed (step 2010) by either: (a) computing the hypothetical depth of the scene point 802 and then using simple geometric constructions to determine the lines of sight passing through this hypothetical scene point 802 and the view points 216, 222, and 224 of the non-reference imagers 206, 212, and 214; or (b) using the well known "image homography equation" to calculate the respective lines of sight directly. Using the lines of sight computed in step 2010, the corresponding pixel in each image is selected (step 2012). For example, using hypothetical line of sight 810 for imager 212, the algorithm selects the pixel closest to the point of intersection 812 of the line of sight 810 with the image generated by camera 212. For each pixel thus selected (one pixel for the reference image and one pixel for each non-reference image) the table 602 illustrated in FIG. 6 is used to calculate the "error"—i.e., the difference between the actual brightness of the pixel and the predicted pixel value indicated in the table 602 (step 2014). The sum of square errors—i.e., the sum of the squares of the respective error values computed in step 2014—is computed for the line of sight selected in step 2008 (step 2016). This sum of square errors is associated with a particular line of sight of the first non-reference imager. If there are any additional lines of sight to be evaluated (step 2018), the procedure repeats by selecting a new pixel within the line 804 of possible pixels in the first non-reference image (step 2006) and evaluating the line of sight associated with this pixel in accordance with steps 2008-2016 discussed above. If there are no more lines of sights to be evaluated (step 2018), the algorithm compares the sums of square errors associated with the respective lines of sight evaluated as discussed above, and chooses the line of sight of the first non-reference imager that has the lowest sum of square errors (step 2020). Based on this chosen line of sight of the first non-reference imager, the algorithm computes the corresponding lines of sight of the other non-reference imagers (step 2022) and determines the pixel in each of the non-reference images that is closest to the selected line of sight for that imager (step 2024). In other words, one pixel is selected from the reference image and one pixel is selected from each one of the non-reference images. The pixel values are brightness-normalized—e.g., by dividing the brightness values by the respective exposure settings used to capture them—and a weighted average of the brightness-normalized pixel values is computed to determine the value of the corresponding pixel in the final image (step 2026). If there are any additional pixels in the final image that remain to be computed (step 2028), the algorithm moves on to the next pixel in the final image (step 2002), and repeats steps 2004-2026 for that additional pixel. If no further pixels remain to be computed (step 2028), the algorithm terminates (step 2030).

Functions for combining differently exposed pixel brightnesses are well known in the art. One approach is simply to brightness-normalize the non-saturated pixels—e.g., by dividing them by the respective exposure settings used to capture them—and then average the results. A weighted average provides an even better estimate for the brightness value HDR of the final pixel:

$$HDR = \Sigma_i W_i * M_i,$$

where $M_i$ is the brightness of pixel i, the sum preferably being computed using only those pixels that are not saturated (i.e., $M_1 < 1$). Techniques for computing suitable choices for the weight $W_i$, are well known in the art and include, for example, setting the weight $W_i$ of each pixel i to be inversely proportional to the average error for the particular measured value $M_i$. For any given camera or detector, these errors can be determined experimentally by taking repeated measurements of a fixed scene and then computing the variance of the results of those measurements as a function of pixel brightness.

Figure 1:
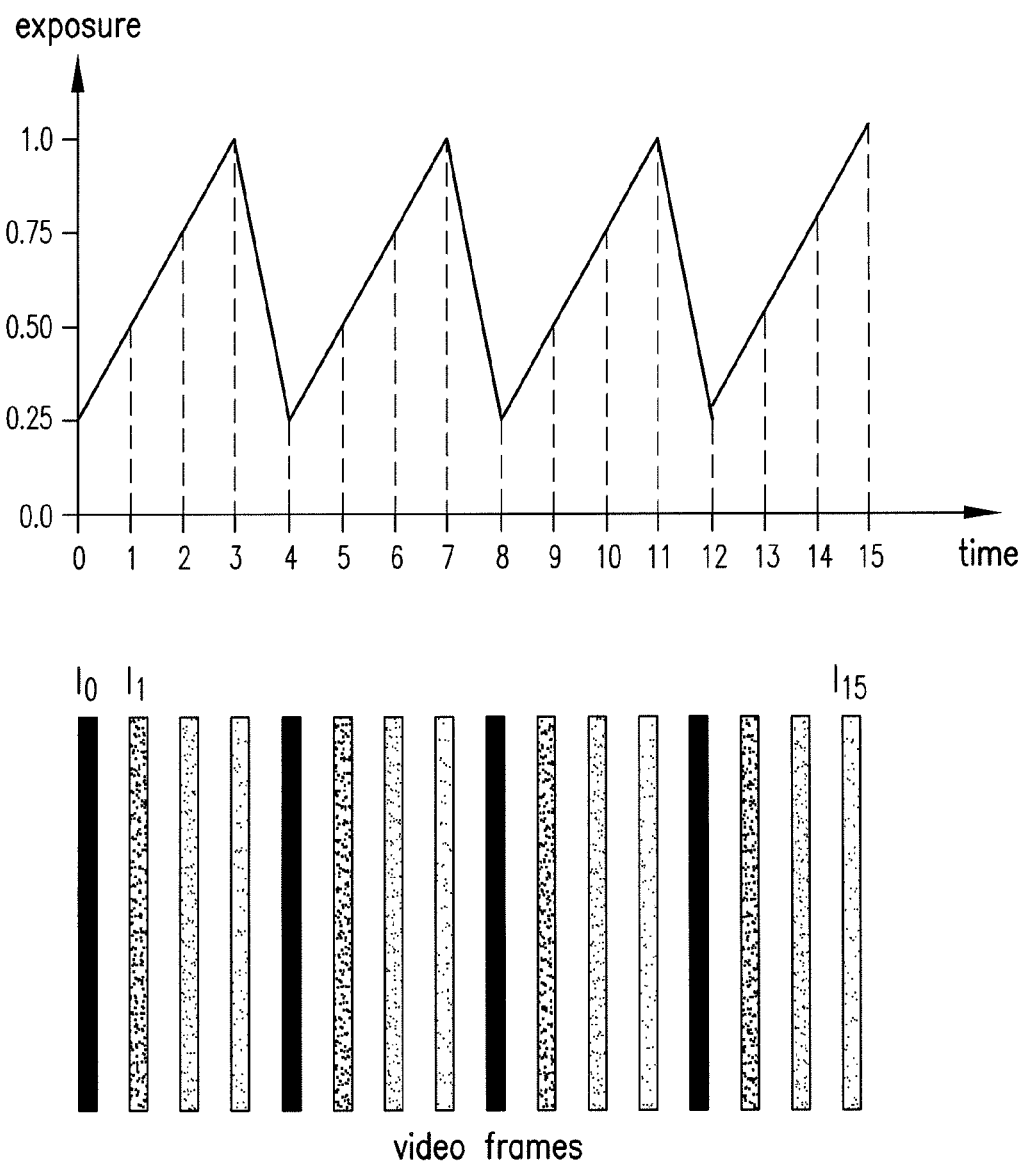
FIG. 1 is a graph and diagram illustrating an exemplary procedure for changing an imager exposure setting during the capture of video data in accordance with the present invention.
Figure 3:
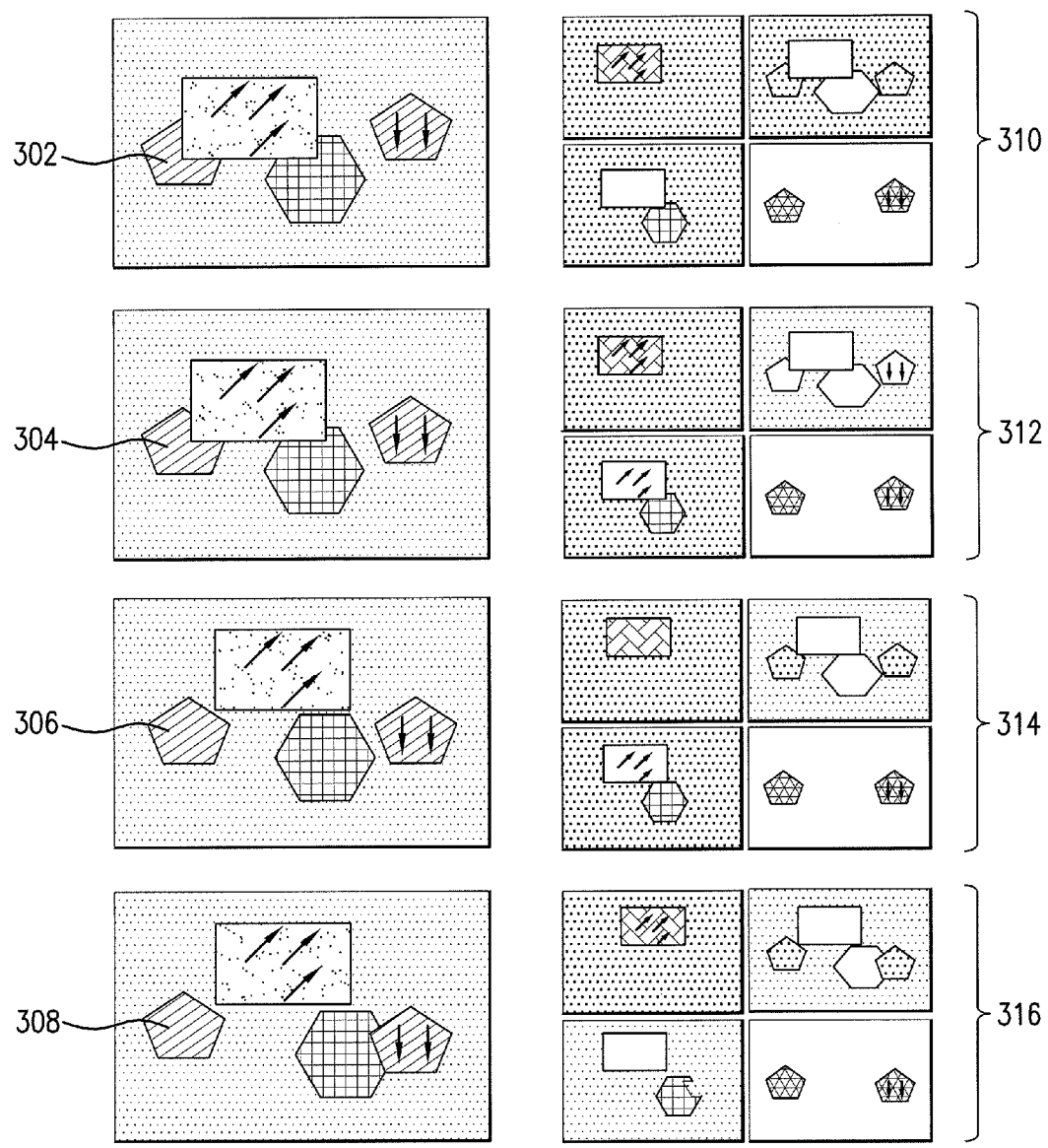
FIG. 3 is a diagram illustrating exemplary image data derived by an imaging method and system in accordance with the present invention.

In accordance with an additional aspect of the present invention, the exposure setting of an imager can be varied with time as a sequence of images or video frames is captured. For example, FIG. 1 illustrates a sequence of video frames $I_0$-$I_{15}$ in which the exposure setting of the video camera is varied in an iterative cycle which repeats every four frames. Because the scene is thus imaged at a variety of different exposure settings, every portion of the scene—whether poorly lit, moderately lit, or brightly lit—is accurately exposed at least once per cycle. The un-normalized sequence of video frames is preferably not displayed to a viewer as a single video picture without further processing, because the rapidly changing exposure settings would make the resulting video sequence visually jarring. A number of different procedures can be used to present the captured information to a viewer. For example, as is illustrated in FIG. 3, the information can be presented as a "quad-view" video. For the illustrated sequence of changing world states 302, 304, 306, and 308, the multiple-exposure video images are presented as corresponding quad-view frames 310, 312, 314, and 316.

Figure 7:
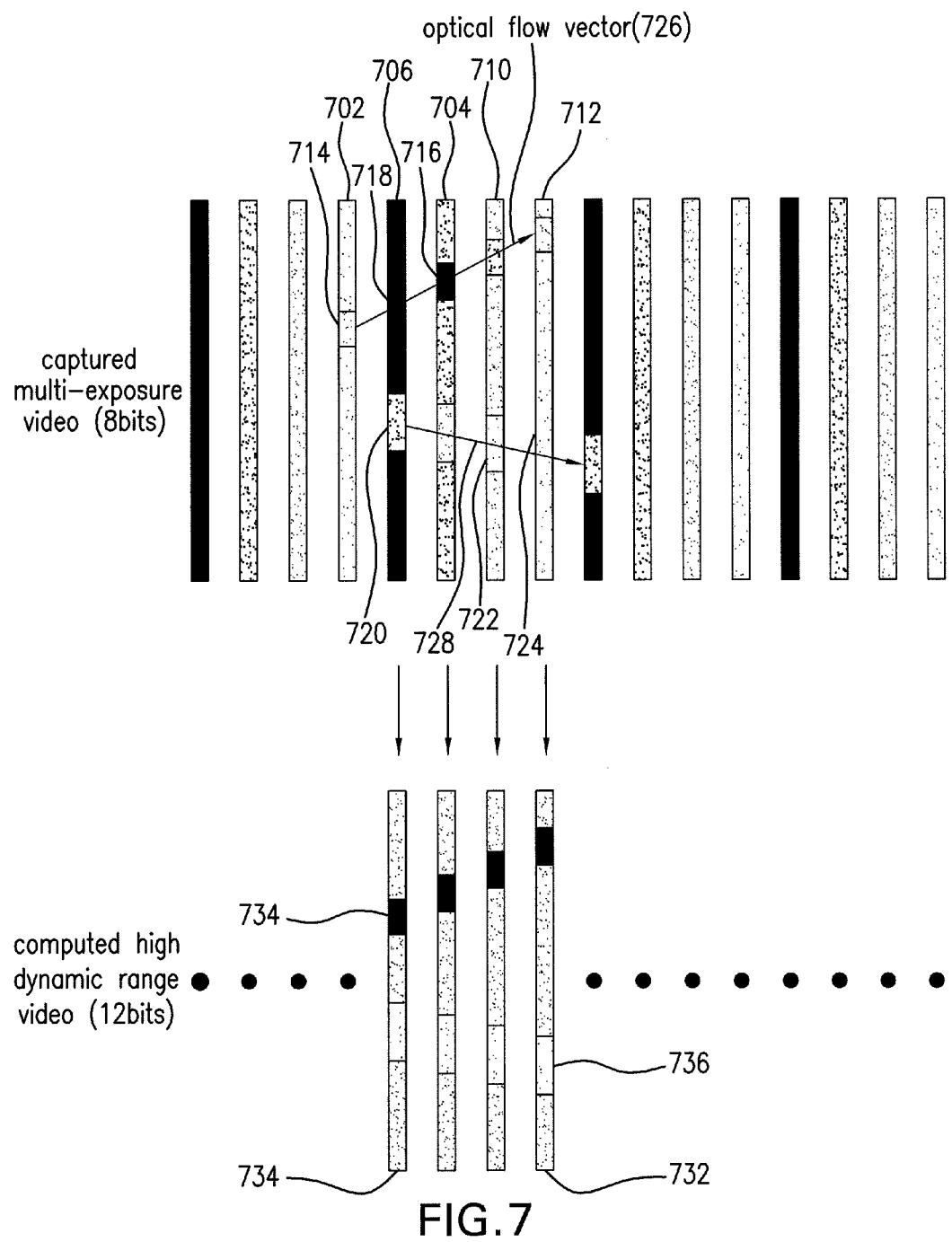
FIG. 7 is a diagram illustrating an imaging procedure using optical flow in accordance with the present invention.
Figure 13A:
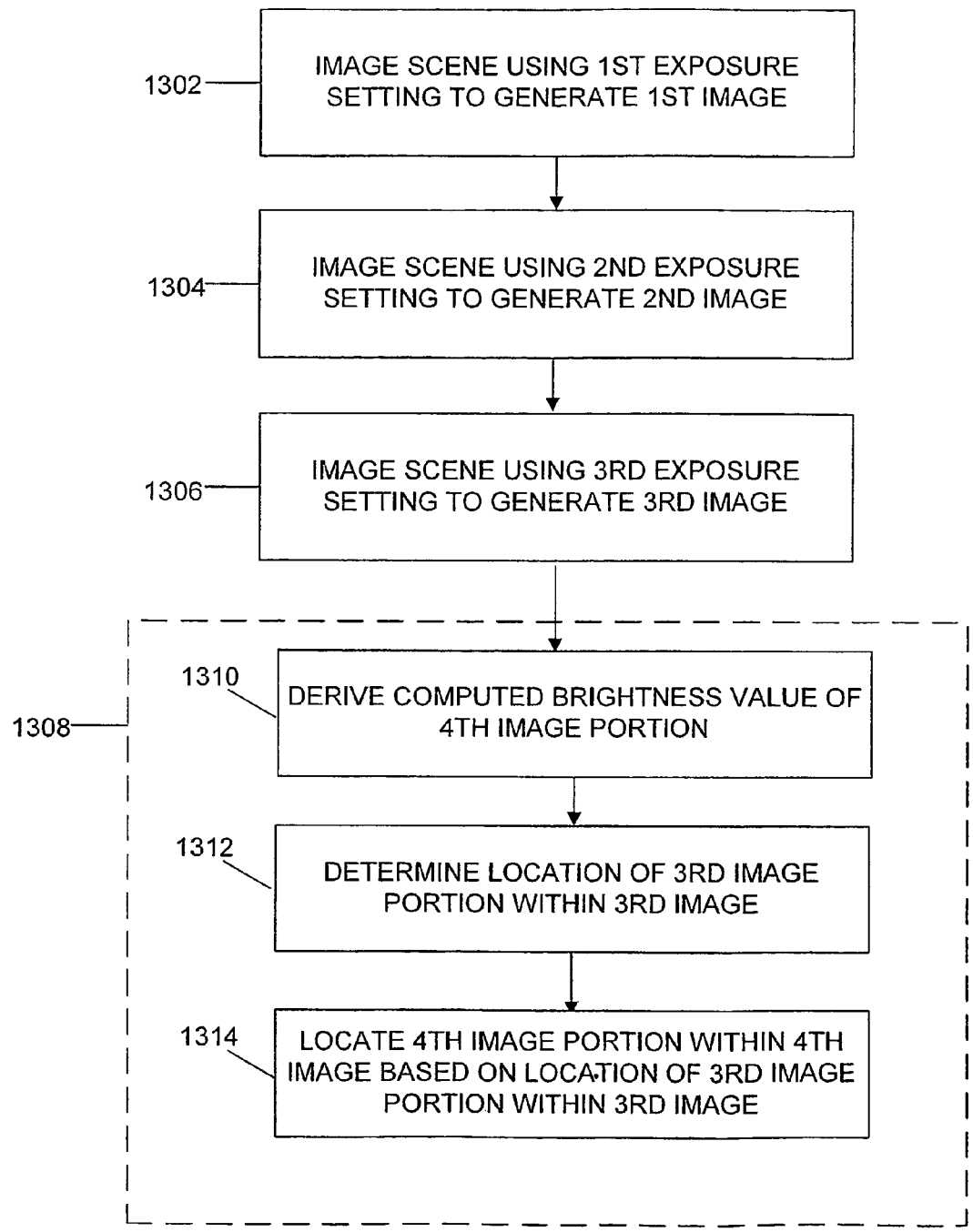
FIG. 13A is a flow diagram illustrating yet another exemplary procedure for deriving high dynamic range image data in accordance with the present invention.
Figure 13B:
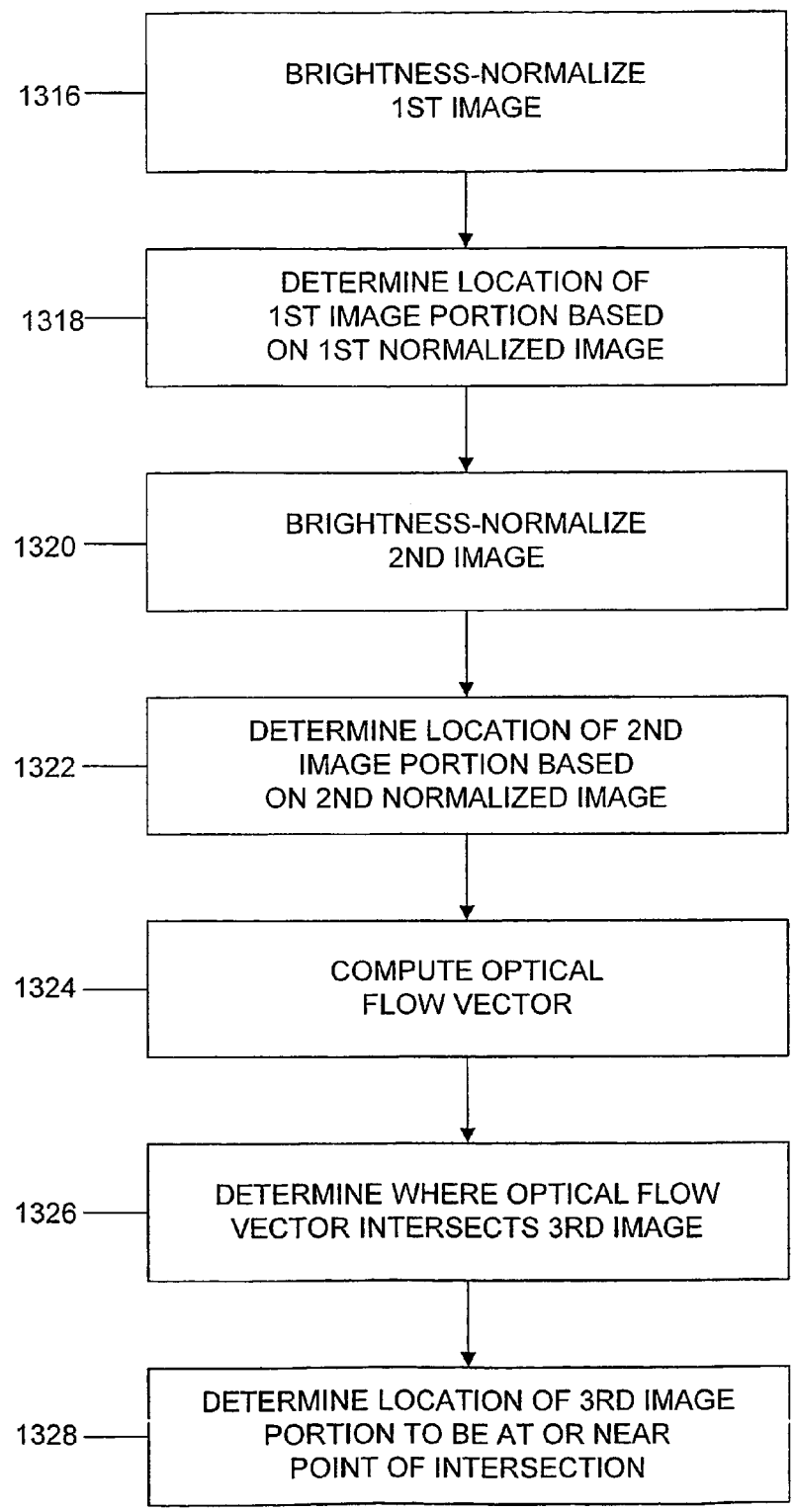
FIG. 13B is a flow diagram illustrating an additional exemplary procedure for deriving high dynamic range image data in accordance with the present invention.

An additional procedure for processing the multiple-exposure video sequence is illustrated in FIGS. 7, 13A, and 13B. The illustrated procedure uses an "optical flow" technique to track an object of interest based on the object's location in images in which it can be seen. The resulting location information is used to approximate the location in which the object should have appeared in an image in which the object was too bright or too dark to be seen clearly. To perform the optical flow procedure, the scene is imaged multiple times using first, second, and third exposure settings to generate, respectively, a first image 702 (step 1302), a second image 704 (step 1304), and a third image 706 (step 1306). In the illustrated example, the scene contains at least one object of interest, and the exposure setting of the first image is such that, in the first image 702, the image portion 714 corresponding to the object of interest has a brightness value within the preferred brightness range of the imager. As a result, the object of interest can be seen accurately in the first image 702. Similarly, the second image 704 has an exposure setting such that the object of interest is also properly exposed in the second image. In other words, in the second image 704, the image portion 716 corresponding to the object of interest has a brightness value which is within the preferred brightness range of the imager. In any image in which the object is sufficiently clearly represented, any conventional object detection or recognition program (e.g., a face recognition program) can be used to determine the location of the object within the image. In the illustrated example, the object has moved between the times at which the first and second images 702 and 704 were captured. Accordingly, the object of interest appears at a first location within the first image 702 and a second, different location within the second image 704. Unlike the exposure settings of first and second images 702 and 704, the exposure setting of the third image 706 is such that the object of interest is not properly exposed in the third image 706 and, in fact, may not even be visible in the third image 706. The third image 706 includes an image portion 718 corresponding to the object of interest—i.e., where the object of interest would appear if it were properly exposed. However, the brightness value of this image portion 718 is not within the preferred brightness range of the imager. In the illustrated example, the time at which the third image 718 is captured is different from the times at which the first and second images are captured. Typically, the third image is captured before, between, or after the times at which the first and second images are captured. Rather than representing the object of interest using the poorly exposed image portion 718 in the third image, a fourth image 730 is derived from the first, second, and third images 702, 704, and 706 (step 1308). The fourth image 730 includes an image portion 734 which represents the object of interest. The brightness value of this image portion 734 is computed (step 1310) based on: (a) the brightness values of the relevant portions 714 and 716 of the first and second images 702 and 704; and (b) the first and second exposure settings. The location of the relevant image portion 718 within the third image 706—in which the object of interest would appear clearly if it were properly exposed—is determined based on the locations of the relevant portions 714 and 716 of the first and second images 702 and 704 (step 1312). For example, a least square error regression algorithm can be used to determine the optical flow vector that minimizes the squares of differences in the normalized brightnesses of the pixels intersected by the vector. The corresponding portion 734 of the fourth image 730 is placed in the same location in the fourth image 730 (step 1314).

The location of image portion 718 within the third image 706 can be estimated by interpolation or extrapolation of the motion of the object of interest. If the third image 706 is captured between the capture times of the first and second images 702 and 704, an interpolation can be performed to calculate the optical flow vector 726 representing the motion of the object being imaged. The vector 726 is calculated based on the respective locations of image portions 714 and 716 in the first and second images. The vector 726 indicates the location of image portion 718 in the third image 706, even if the object of interest cannot be seen in the third image 706.

FIG. 13B illustrates an exemplary procedure for computing the optical flow vector 726 and using this vector 726 to determine the location of the image portion 718 in the third image 706, as is discussed above with respect to FIG. 13A. The procedure illustrated in FIG. 13B can be used as step 1312 of the procedure illustrated in FIG. 13A. In the procedure illustrated in FIG. 13B, the first image 702 is brightness-normalized to derive a first normalized image (step 1316). The first normalized image is used to determine the location of the image portion 714 within the first image (step 1318). The second image 704 is brightness-normalized to derive a second normalized image (step 1320). The second normalized image is used to determine the location of the image portion 716 within the second image 704 (step 1322). The optical flow vector 726 discussed above is computed based upon the locations of the respective image portions 714 and 716 within the first and second images 702 and 704 (step 1324), these locations having been determined based upon the brightness-normalized images computed in steps 1316 and 1320. Brightness-normalizing the images 702 and 704 used to compute the optical flow vector 726 provides greater accuracy by reducing the effect of differences in the exposure settings of the images 702 and 704 used to determine the optical flow vector 726. The algorithm determines the approximate location within the third image 706 at which the optical flow vector 726 intersects the third image (step 1326). The location of the third image portion 718 within the third image 706 is determined to be approximately at the point of intersection determined in step 1326 (step 1328).

A number of well known optical flow algorithms are suitable for interpolating or extrapolating the motion of an object in the above-described procedure. For example, a sum-of-square-distances (SSD) procedure can be used to calculate the appropriate vector 726 by minimizing the sum of the square distances between the vector 726 and the respective scene portions 714 and 716 representing the object of interest. For better accuracy, the scene portions 714 and 716 used to compute the vector 726 are preferably brightness-normalized before performing the SSD regression.

FIG. 7 also illustrates an additional example in which the third image 712 is captured after first and second images 706 and 710. In this example, the optical flow vector 728 is determined based upon the respective locations of the image portions 720 and 722 in which the object of interest appears in the first and second images 706 and 710, and the vector 728 is then used to extrapolate the location of the image portion 724 in which the object should appear (but may not be represented clearly or accurately) in the third image 712. The location of the relevant image portion 724 within the third image 712 is used as the location of the image portion 736 representing the object within the fourth image 732 (step 1314).

Figure 4:
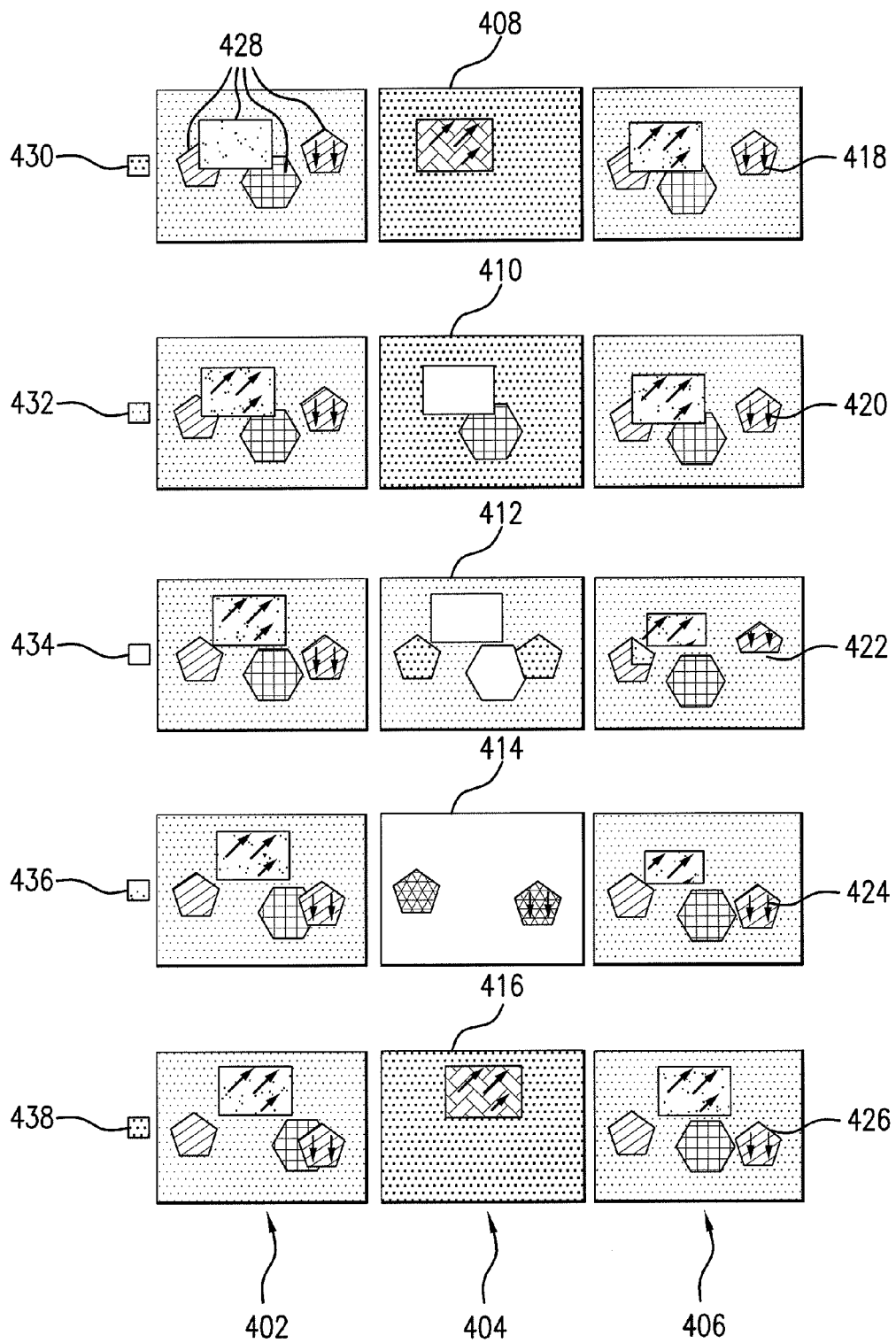
FIG. 4 is a diagram illustrating additional exemplary image data generated by an imaging method and system in accordance with the present invention.
Figure 14:
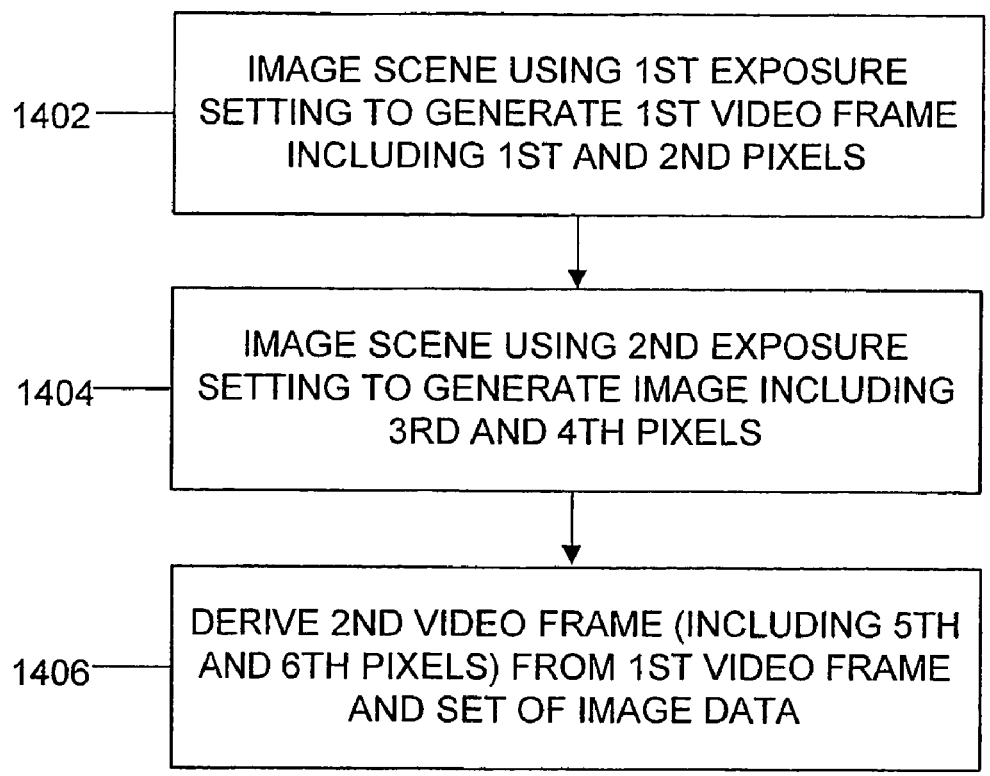
FIG. 14 is a flow diagram illustrating a still further exemplary procedure for deriving high dynamic range image data in accordance with the present invention.
Figure 15:
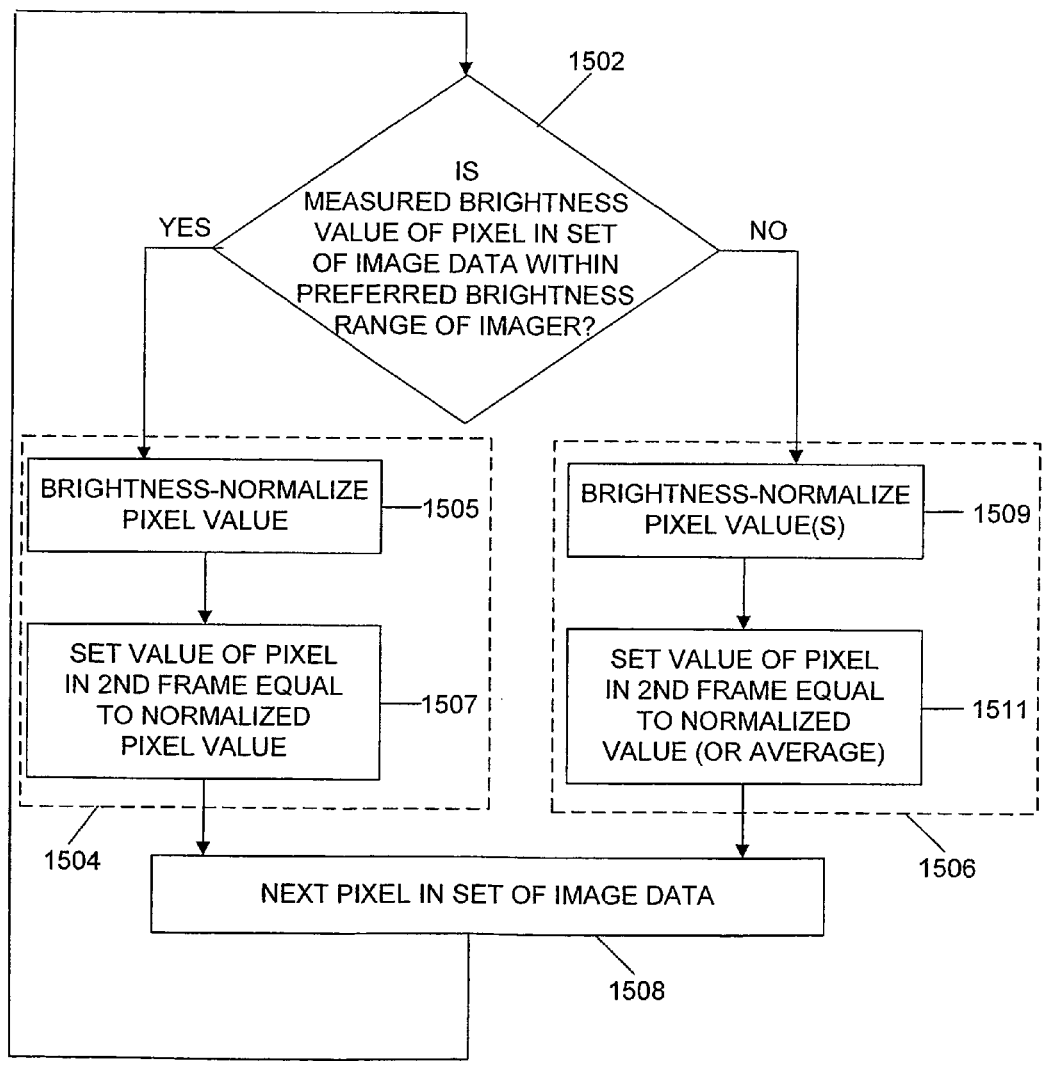
FIG. 15 is a flow diagram illustrating an exemplary video frame derivation procedure for use in the procedure illustrated in FIG. 14.

In cases in which limited processing power is available, it may be desirable to process the multi-exposure video stream with as little computation as possible. One way to accomplish this is to use a procedure which considers each pixel of each captured image and only updates a given pixel in the video output if the brightness of that pixel is within the preferred brightness range of the imager. An example of such a procedure is illustrated in FIGS. 4, 14, and 15. In the illustrated procedure, a scene 402 is imaged using a first exposure setting to capture an image 408 which is used as, or used to derive, a first video frame 418 (step 1402). The resulting video frame 418 includes one or more pixels representing portions of the scene 402. The scene 402 is imaged again using a second (different) exposure setting to capture an image 410 which also includes corresponding pixels representing portions of the scene 402 (step 1404). Rather than directly using the image 410 captured in step 1404 as a second video frame, the second video frame 420 is derived from the first video frame 418 and image 410 (step 1406) by considering each pixel of the image 410 and determining whether the pixel is within the preferred brightness range of the imager. An exemplary procedure 1406 for deriving the pixels of the second video frame 420 is illustrated in FIG. 15. If the brightness value of a particular pixel in the image 410 is within the preferred brightness range of the imager (step 1502), the value of the corresponding pixel in the second video frame 420 is derived from the value of the pixel in the image 410 (step 1504). Typically, the value of the pixel in the second video frame 420 is derived (in step 1504) by brightness-normalizing the value of the pixel in the image 410 to derive a normalized pixel value (step 1505) and setting the value of the pixel in the second video frame equal to the resulting, normalized pixel value (step 1507).

On the other hand, if the brightness value of the pixel in the image 410 is not within the preferred brightness range of the imager (step 1502), the value of the corresponding pixel in the second video frame 420 is derived (step 1506) from either: (a) the value of the corresponding pixel in the first video frame 418; or (b) an average of the values of pixels in the neighborhood of the corresponding pixel in image 410. For example, the procedure can use a 3×3 pixel or larger neighborhood centered on the pixel in image 410, omitting any pixels whose brightnesses are not within the preferred brightness range of the imager. Typically, the value of the pixel in the second video frame 420 is derived (in step 1506) by brightness-normalizing the value of the pixel in the first video frame 418 or the values in the neighborhood of the pixel in the image 410 to derive a normalized pixel value or a normalized average pixel value (step 1509). The resulting normalized value is then used as the value of the pixel in the second frame (step 1511). In any case, once the pixel in the second video frame 420 has thus been derived, the procedure moves on to the next pixel in image 410 (step 1508).

An example of video data resulting from the above-described procedure is illustrated in FIG. 4. As can be seen from the drawing, the scene 402 contains various objects 428, some or all of which are moving. Any given frame in the multi-exposure video sequence 404 captured by the imager accurately represents one or more of the scene objects 428 depending on whether a particular scene object is illuminated such that, with the given exposure setting, the imager images the object within the preferred brightness range of the imager. In the illustrated example, each of the respective frames 408, 410, 412, 414, and 416 has been captured with a dynamic range of 8 bits. However, the four exposure settings 430, 432, 434, and 436 of these frames 408, 410, 412, 414 and 416 are distributed so as to give the system a total dynamic range of 32 bits. Each frame (e.g., illustrated fiames 418, 420, 422, 424, and 426) of the output video sequence 406 is preferably brightness-normalized to produce a visually pleasing display. Although some artifacts—e.g., truncated objects and dislocated edges—can be seen in the output sequence 406 as a result of different portions of the image being updated at different times, such artifacts are likely to be minimal if the objects 428 in the scene 402 are moving slowly with respect to the frame rate being used. In particular, the best results are achieved if each object 428 is stationary or moves very little in a single cycle of the different exposure settings. Because only pixels whose brightnesses are within the preferred brightness range are updated in the respective frames 418, 420, 422, 424, and 426 of the output sequence 406, and because each object 428 is likely to be imaged accurately in at least one of the frames 408, 410, 412, 414, and 416 in each cycle of the measured image sequence 404, the output sequence 406 has a much higher dynamic range than would be possible if only a single exposure setting had been used. Preferably, the set of different exposure settings is chosen such that the optimum irradiance ranges overlap between frames so that the entire range of irradiation is covered accurately with no gaps. This ensures that all pixels will eventually be updated.

In accordance with an additional aspect of the present invention, the procedure illustrated in FIGS. 4, 14, and 15 can be further refined by giving preference to the most recent measured value of a pixel if there is a substantial difference between this value and the other measured values of the pixel generated during the most recent cycle of exposure variation. In particular, if the normalized value of the most recent measurement of the pixel differs greatly from the pixel value that would otherwise be chosen as the most accurate value—i.e., the brightness value that is within the preferred brightness range of the imager (step 1406 as illustrated in FIG. 15)—this suggests that, at the location in the scene represented by this particular pixel, there has been a sudden brightness change. Such a sudden change can, for example, occur if one object moves in front of another object, or if an object previously in front of a more distant object has now moved so that it is no longer in front. Preference is therefore given to the most recent measurement of the pixel in question. This technique reduces artifacts in the output video sequence 406 by updating the edges of moving objects more quickly—typically in a single frame—rather than waiting for a frame in which the relevant pixels are within the preferred brightness range of the imager.

It will be appreciated by those skilled in the art that the methods and systems illustrated in FIGS. 1-19 can be implemented on various standard processing arrangements operating under the control of suitable software defined by FIGS. 1, 3-7, and 9-19. Such a processing arrangement can optionally be incorporated into one or more of the above-described imagers used to generate image data, or can be a separate device 226 as is illustrated in FIG. 2. It is to be noted that different processors, memory configurations, data structures and the like can be used to practice the present invention, and the invention is not limited to a specific platform.

It is further to be noted that although the foregoing descriptions have emphasized the monochromatic imaging of scenes as viewed within the visible light spectrum, the disclosed techniques are equally applicable to multi-spectral images. Furthermore, these methods apply to imaging of any form of electromagnetic radiation, including, but not limited to, ultraviolet, infrared, X-ray, radar, etc.

Although the present invention has been described in connection with specific exemplary embodiments, it should be understood that various changes, substitutions, and alterations can be made to the disclosed embodiments without departing from the spirit and scope of the invention as set forth in the appended claims.

We claim:

1. A method for imaging a scene, the scene having one or more objects of interest, the method comprising:

imaging the scene by an imager at a first time to capture a first image, the imager having a preferred brightness range, the imager having a first exposure setting at the first time, the first image having a first set of one or more image portions respectively representing the one or more objects of interest, each one of the first set of one or more image portions having a respective one of a first set of one or more brightness values;

processing at least the first image by an object detection procedure to identify the first set of one or more image portions representing the one or more objects of interest;

based on the first exposure setting and the first set of one or more brightness values, determining a second exposure setting, the second exposure setting allowing the imager to image the one or more objects of interest within the preferred brightness range of the imager; and imaging the scene by the imager at a second time to capture a second image, the object detection procedure comprising a moving object detection procedure, the one or more objects of interest comprising one or more moving objects, the step of processing at least the first image comprising processing the first and second images by the moving object detection procedure to identify the one or more image portions respectively representing the one or more objects of interest.

2. A method according to claim 1, wherein the object detection procedure comprises a face detection procedure, the one or more objects of interest comprising one or more faces.

3. A method according to claim 1, further comprising imaging the scene by the imager at a second time to capture a second image, the imager having the second exposure setting at the second time.

4. A method according to claim 3, wherein the second image has a second set of one or more image portions respectively representing the one or more objects of interest, each one of the second set of one or more image portions having a respective one of a second set of one or more brightness values, the method further comprising:

processing at least the second image by the object detection procedure to identify the second set of one or more image portions respectively representing the one or more objects of interest; and based on the second exposure setting and the second set of one or more brightness values, determining a third exposure setting, the third exposure setting allowing the imager to image the one or more objects of interest within the preferred brightness range of the imager.

5. A method according to claim 4, further comprising imaging the scene by the imager at a third time to capture a third image, the imager having the third exposure setting at the third time.

6. A system for imaging a scene, the scene having one or more objects of interest, the system comprising:

an imager; and a processing arrangement in communication with the imager, the processing arrangement comprising:

an imager controller controlling the imager to image the scene at a first time to capture a first image, the imager having a preferred brightness range, the imager having a first exposure setting at the first time, the first image having a first set of one or more image portions respectively representing the one or more objects of interest, each one of the first set of one or more image portions having a respective one of a first set of one or more brightness values, an image processor processing at least the first image by an object detector to identify the first set of one or more image portions respectively representing the one or more objects of interest, and an exposure processor determining, based on the first exposure setting and the first set of one or more brightness values, a second exposure setting, the second exposure setting allowing the imager to image the one or more objects of interest within the preferred brightness range of the imager, wherein the imager controller of the processing arrangement further controls the imager to image the scene at a second time to capture a second image, the object detector comprising a moving object detector, the one or more objects of interest comprising one or more moving objects, the moving object detector processing the first and second images to identify the one or more image portions respectively representing the one or more objects of interest.

7. A system according to claim 6, wherein the object detector comprises a face detector, the one or more objects of interest comprising one or more faces.

8. A system according to claim 6, wherein the image controller of the processing arrangement further controls the imager to image the scene at a second time to capture a second image, the imager having the second exposure setting at the second time.

9. A system according to claim 8, wherein the second image has a second set of one or more image portions respectively representing the one or more objects of interest, each one of the second set of one or more image portions having a respective one of a second set of one or more brightness values, the image processor further processing at least the second image by the object detector to identify the second set of one or more image portions respectively representing the one or more objects of interest, the exposure processor further determining, based on the second exposure setting and the second set of one or more brightness values, a third exposure setting, the third exposure setting allowing the imager to image the one or more objects of interest within the preferred brightness range of the imager.

10. A system according to claim 9, wherein the imager controller of the processing arrangement further controls the imager to image the scene at a third time to capture a third image, the imager having the third exposure setting at the third time.

* * * * *